INVENTORS
AUGUST T. GONIA
HARRY H. FANTE
BY MITCHELL J. SHEPARD

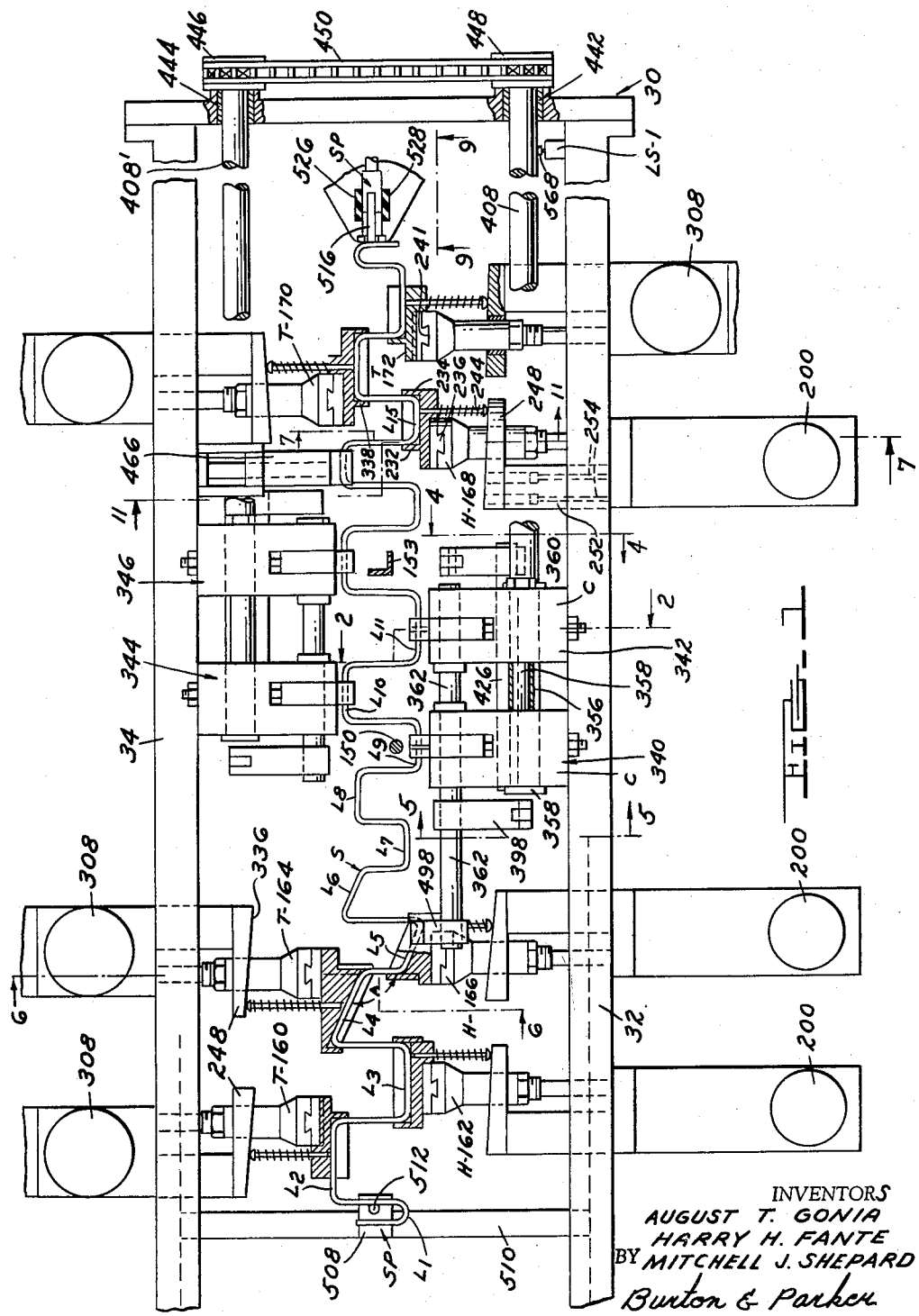

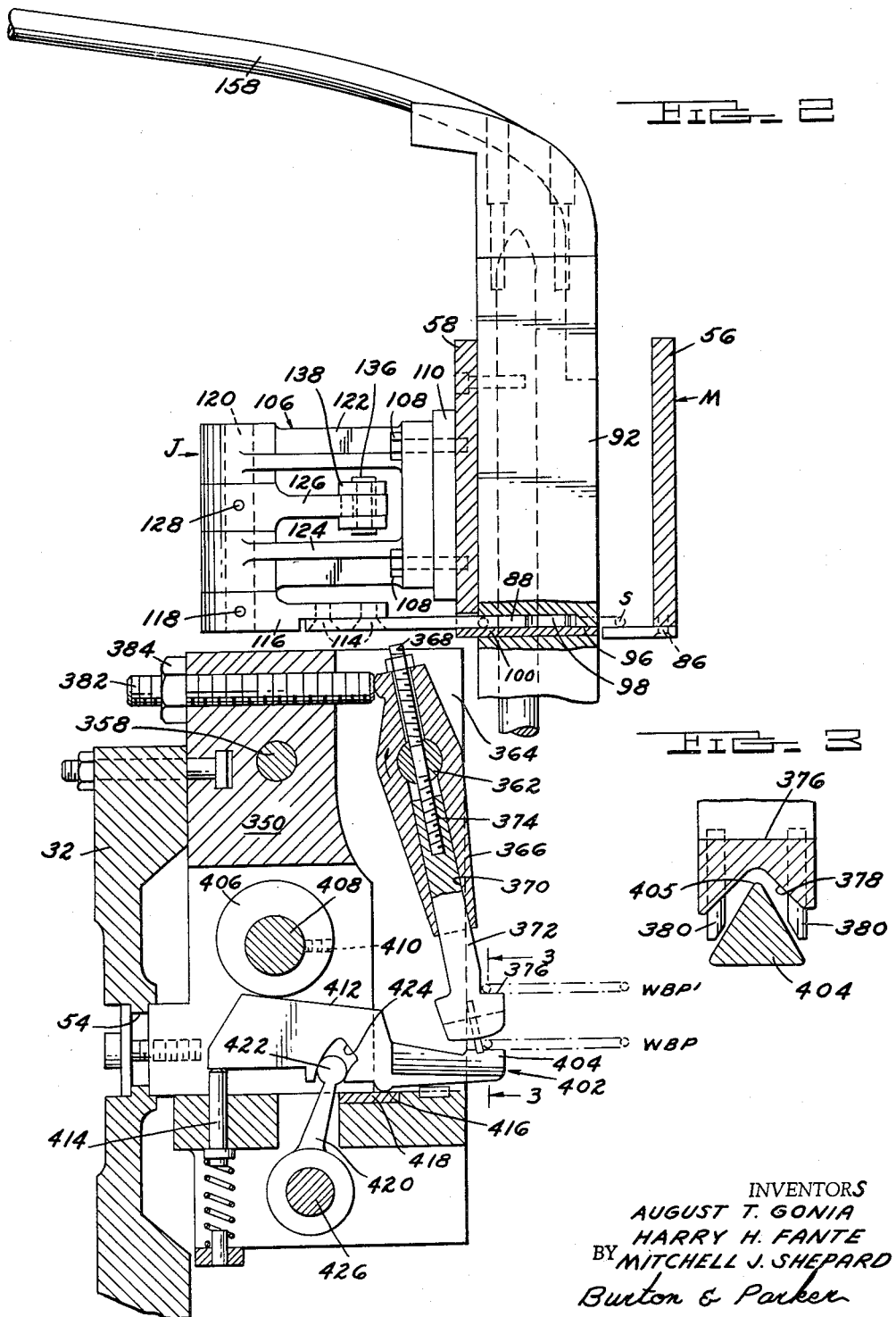

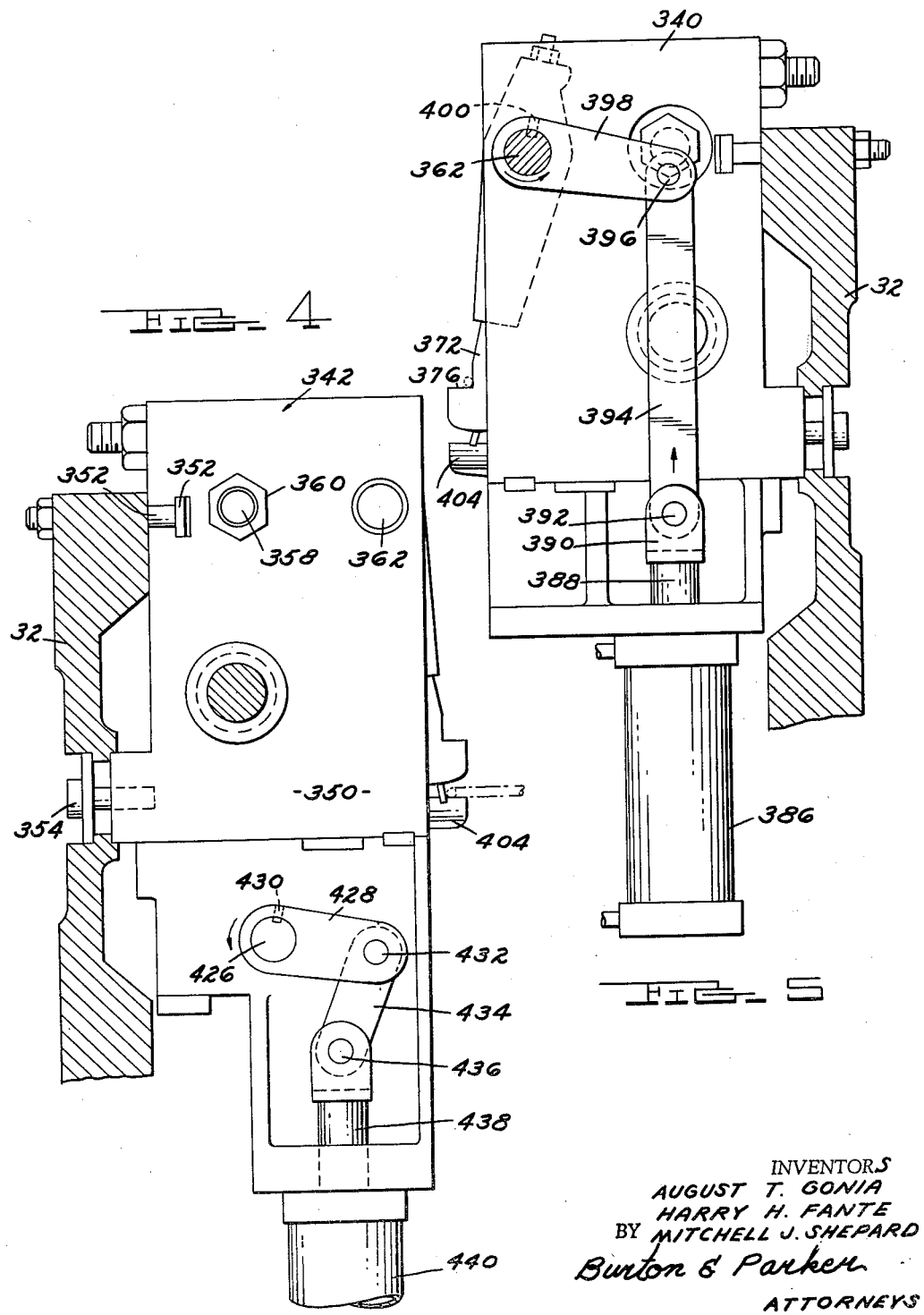

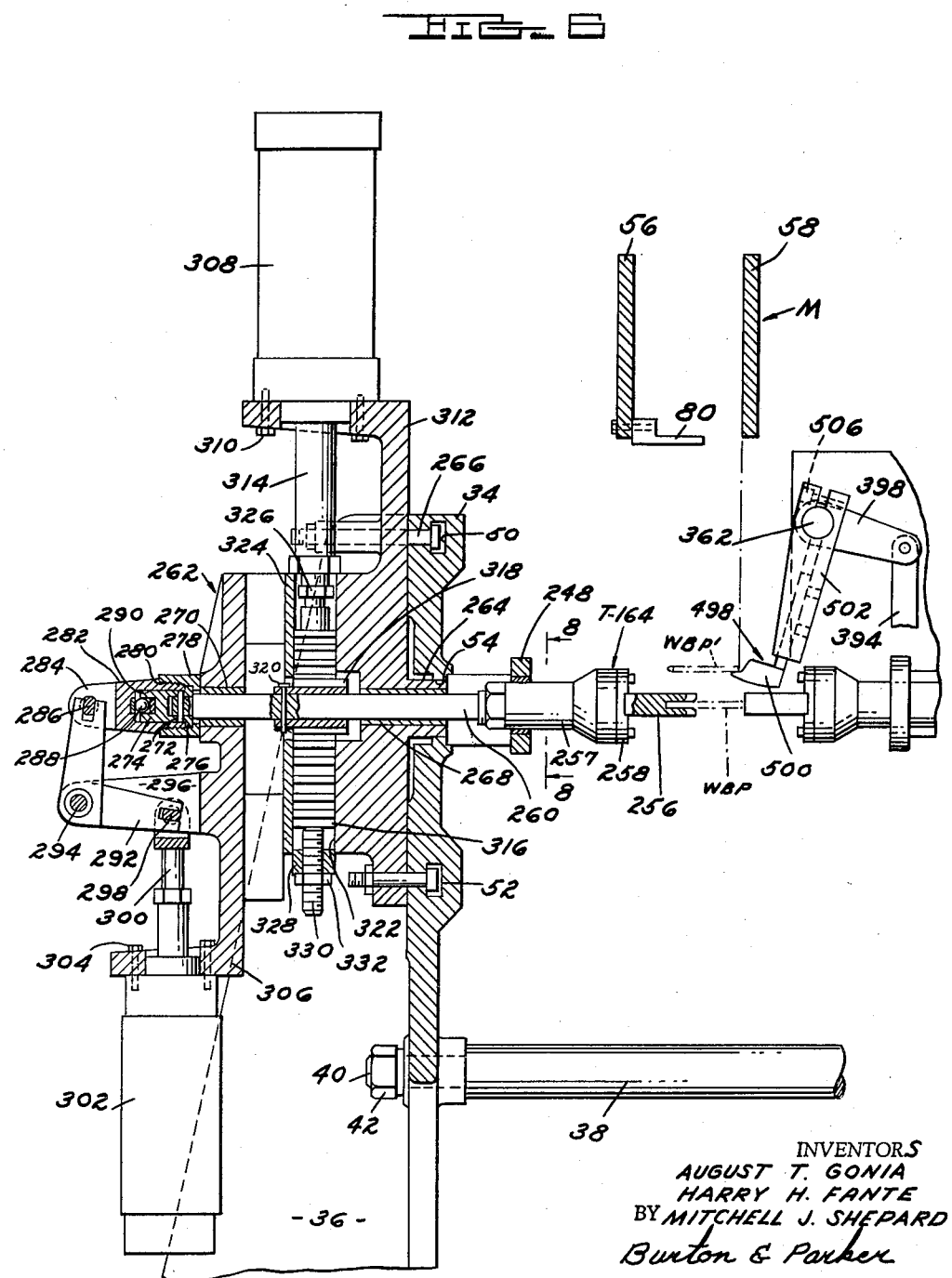

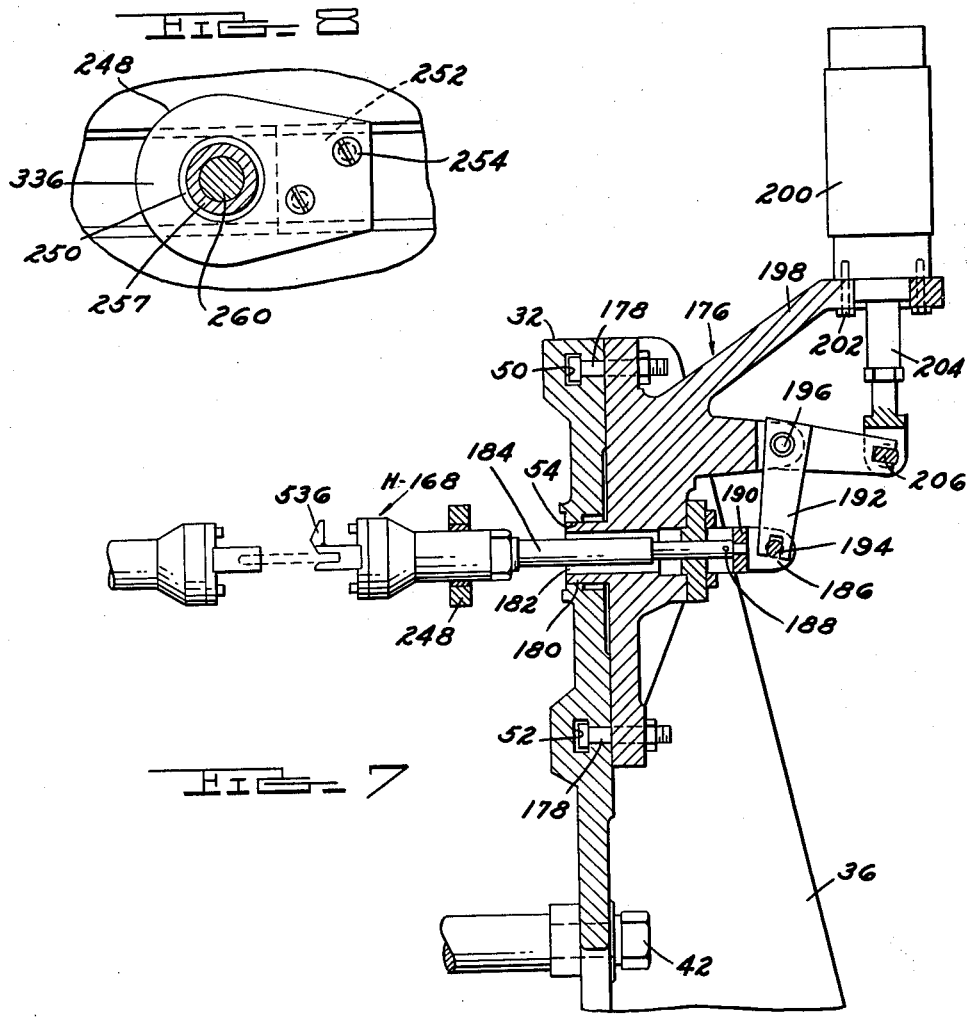

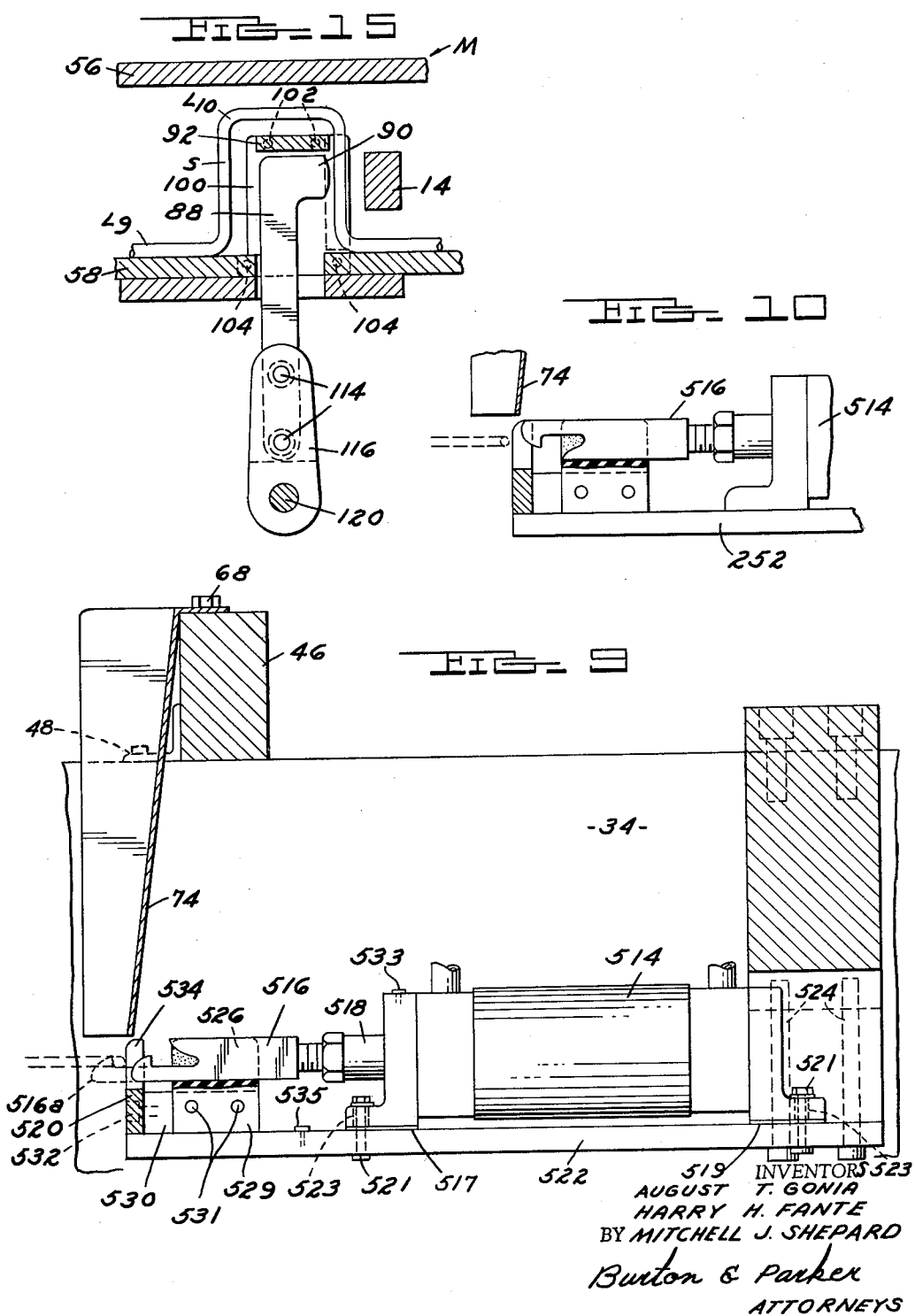

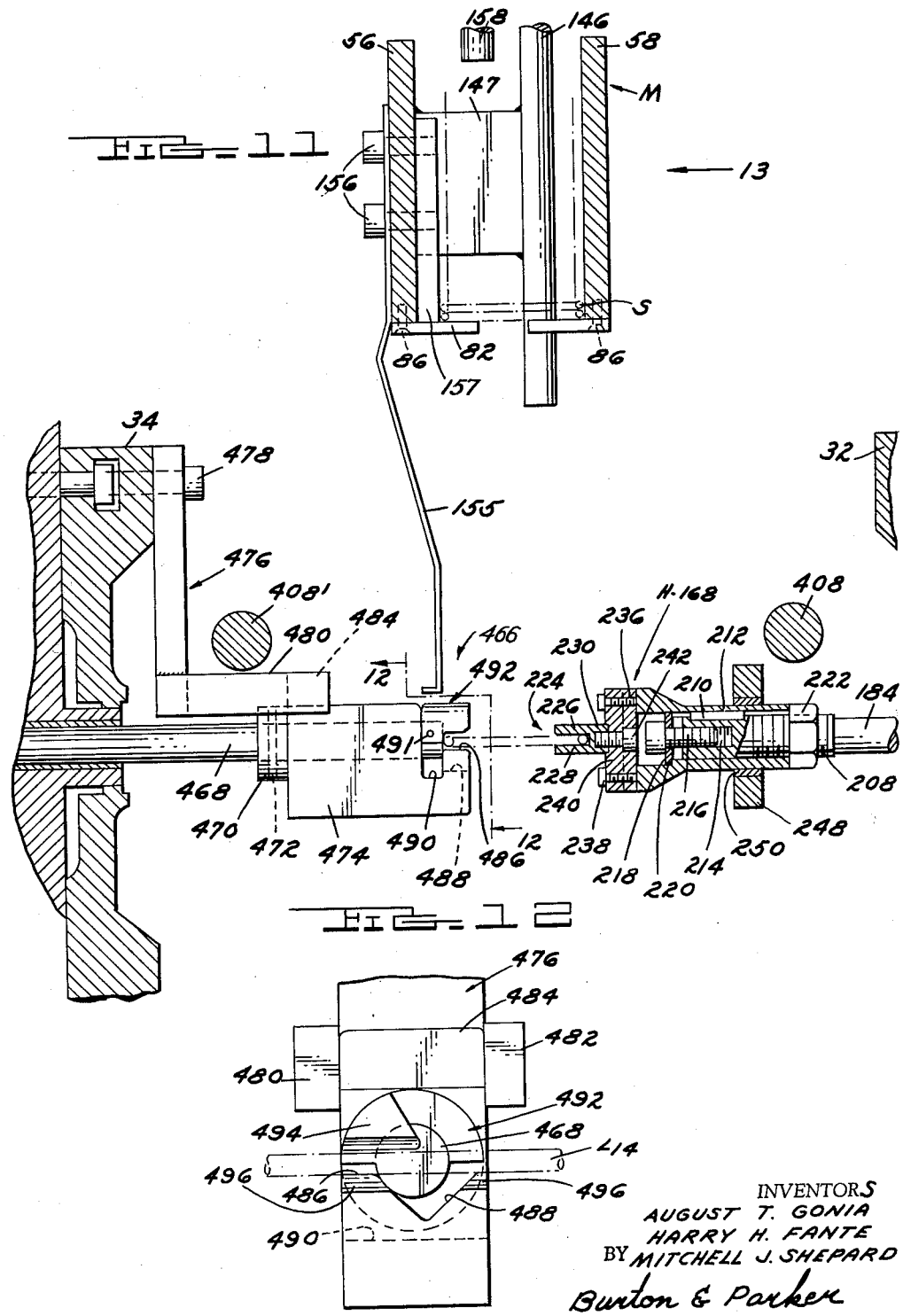

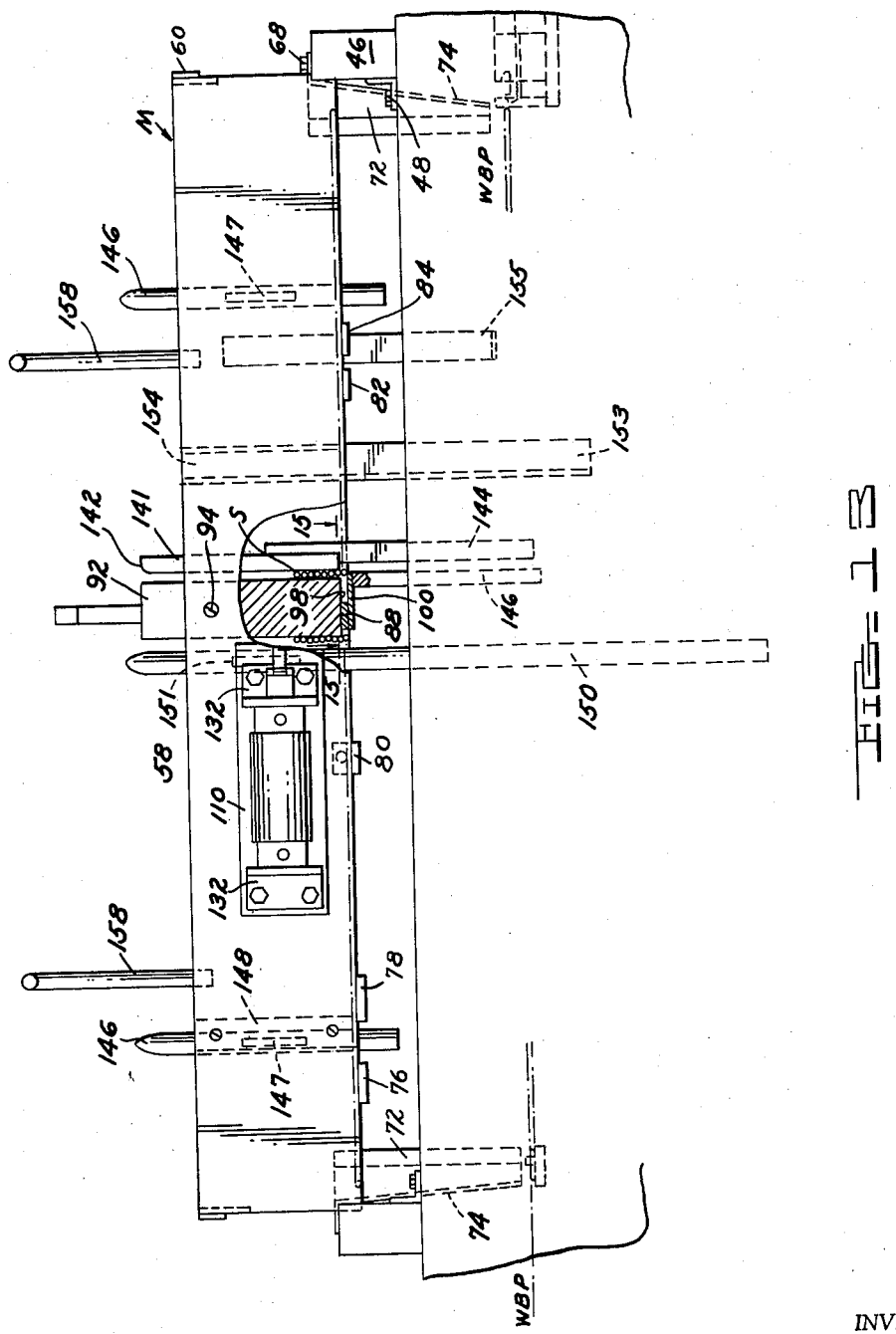

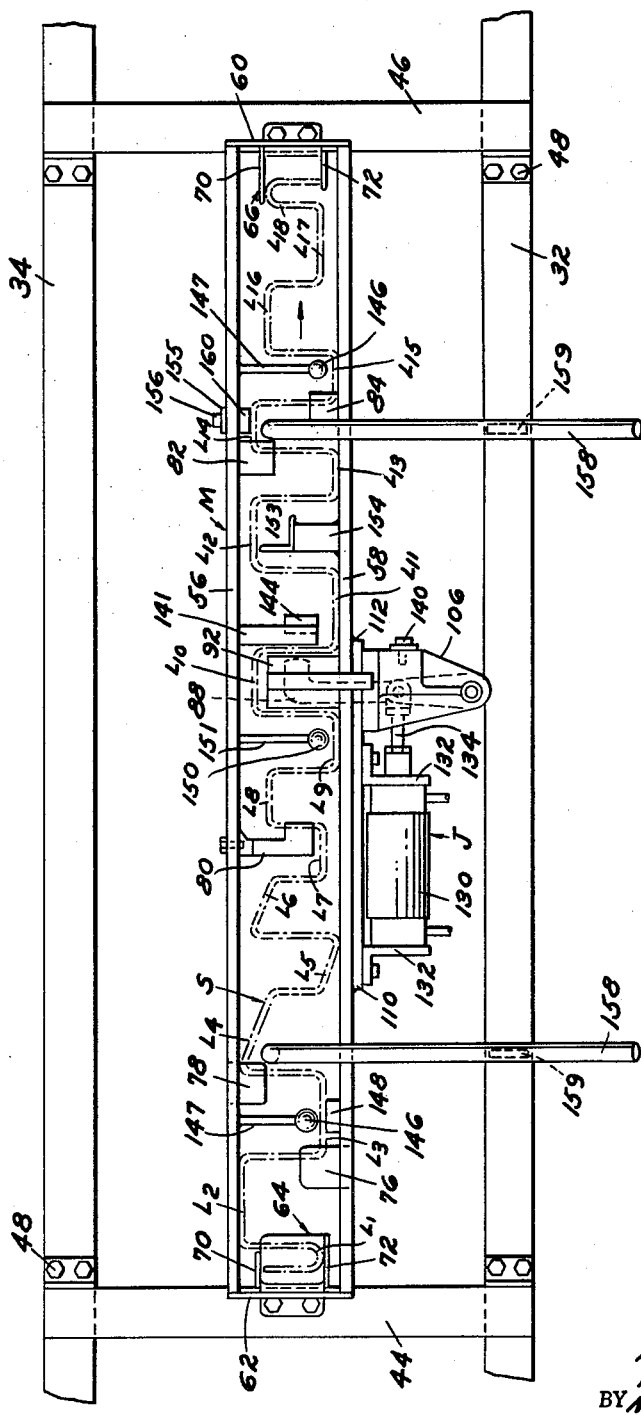

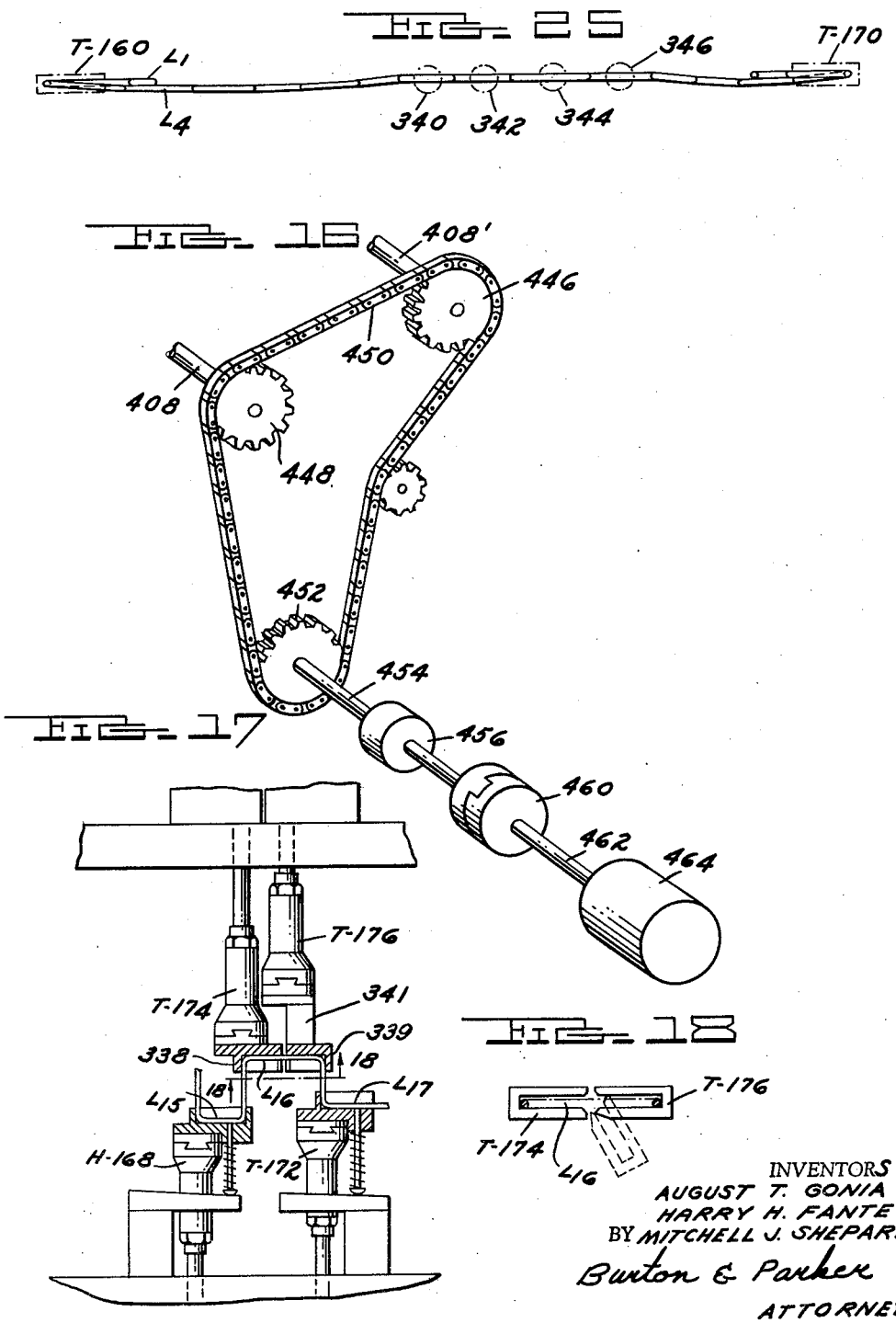

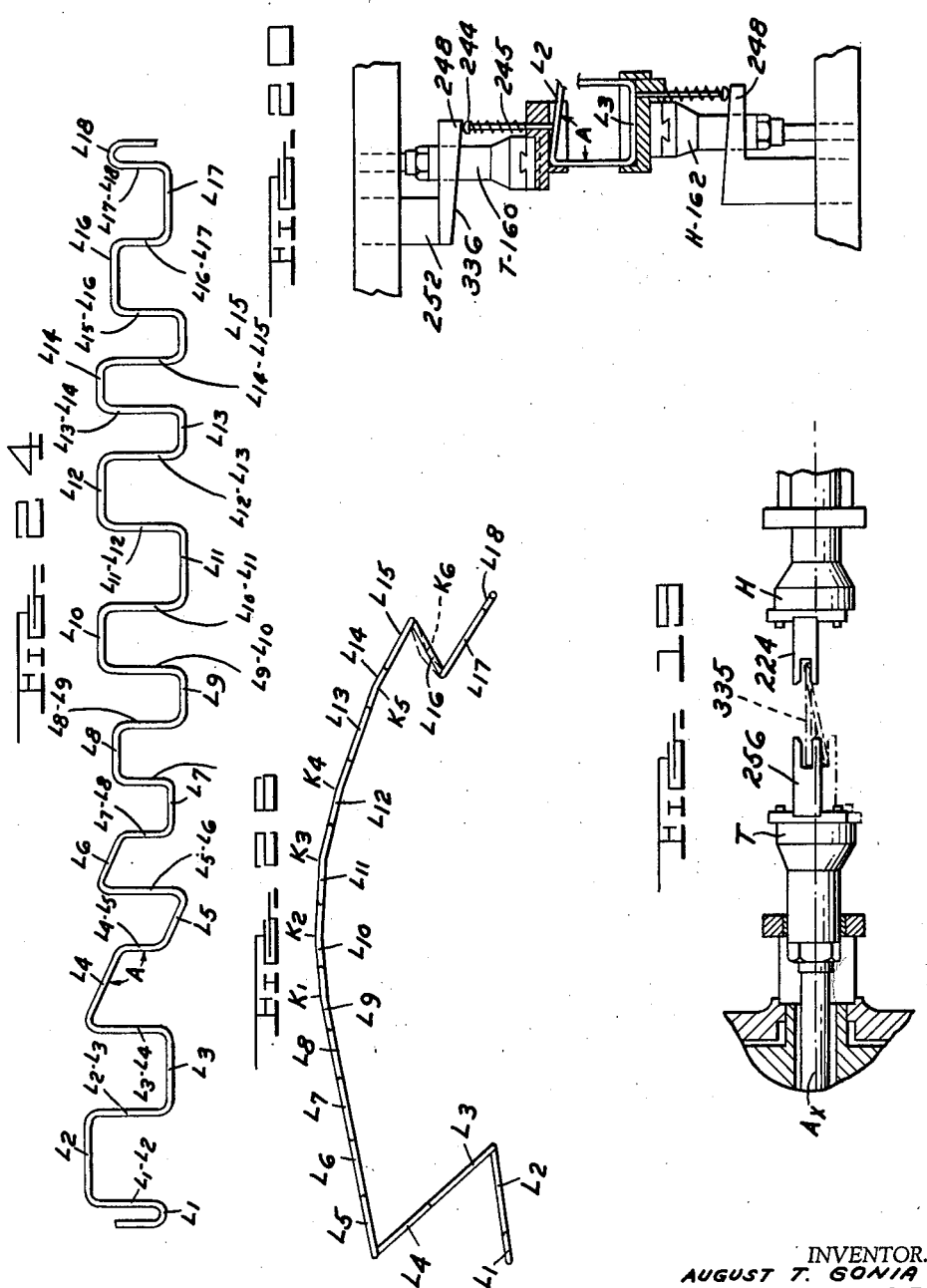

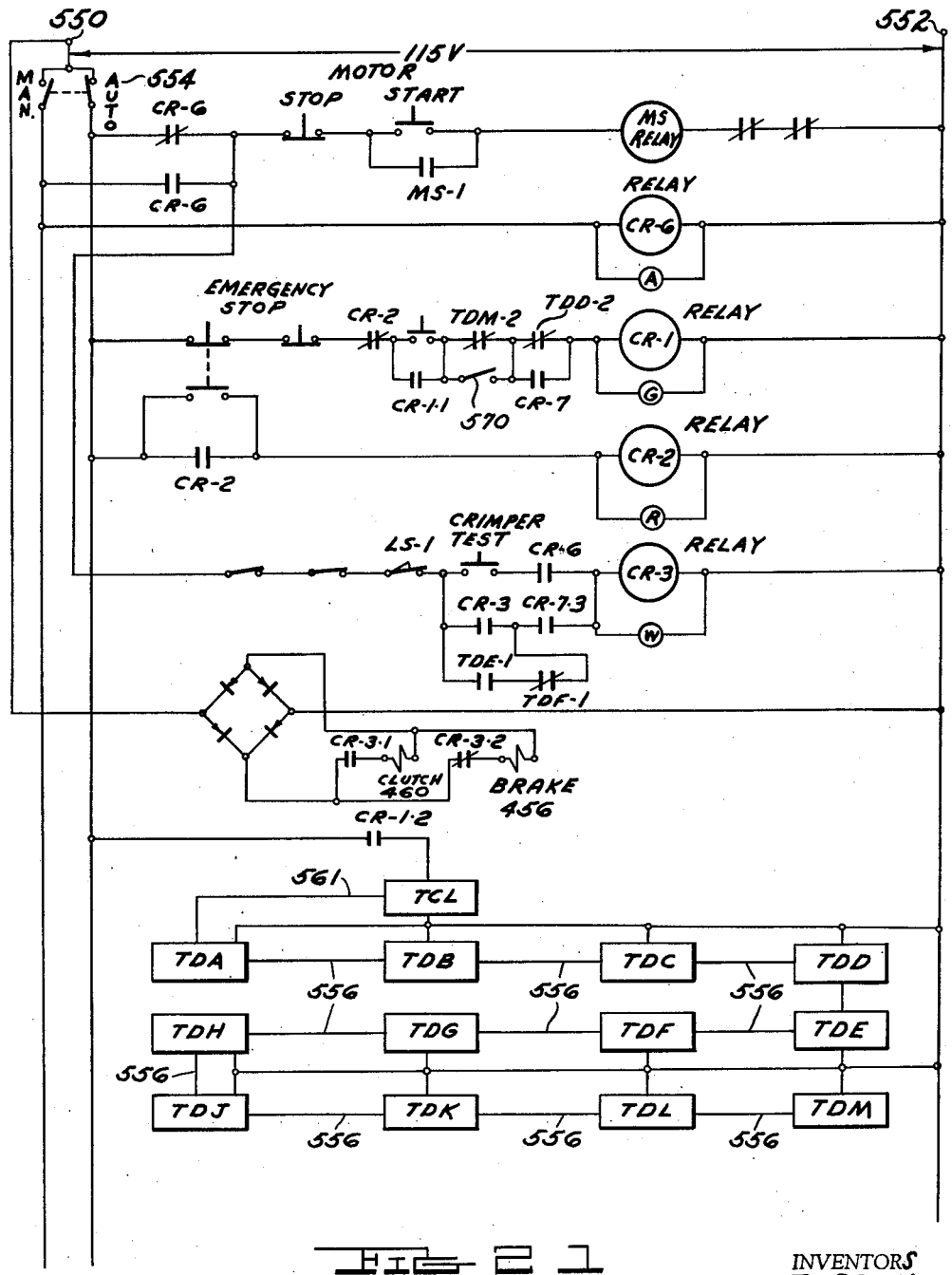

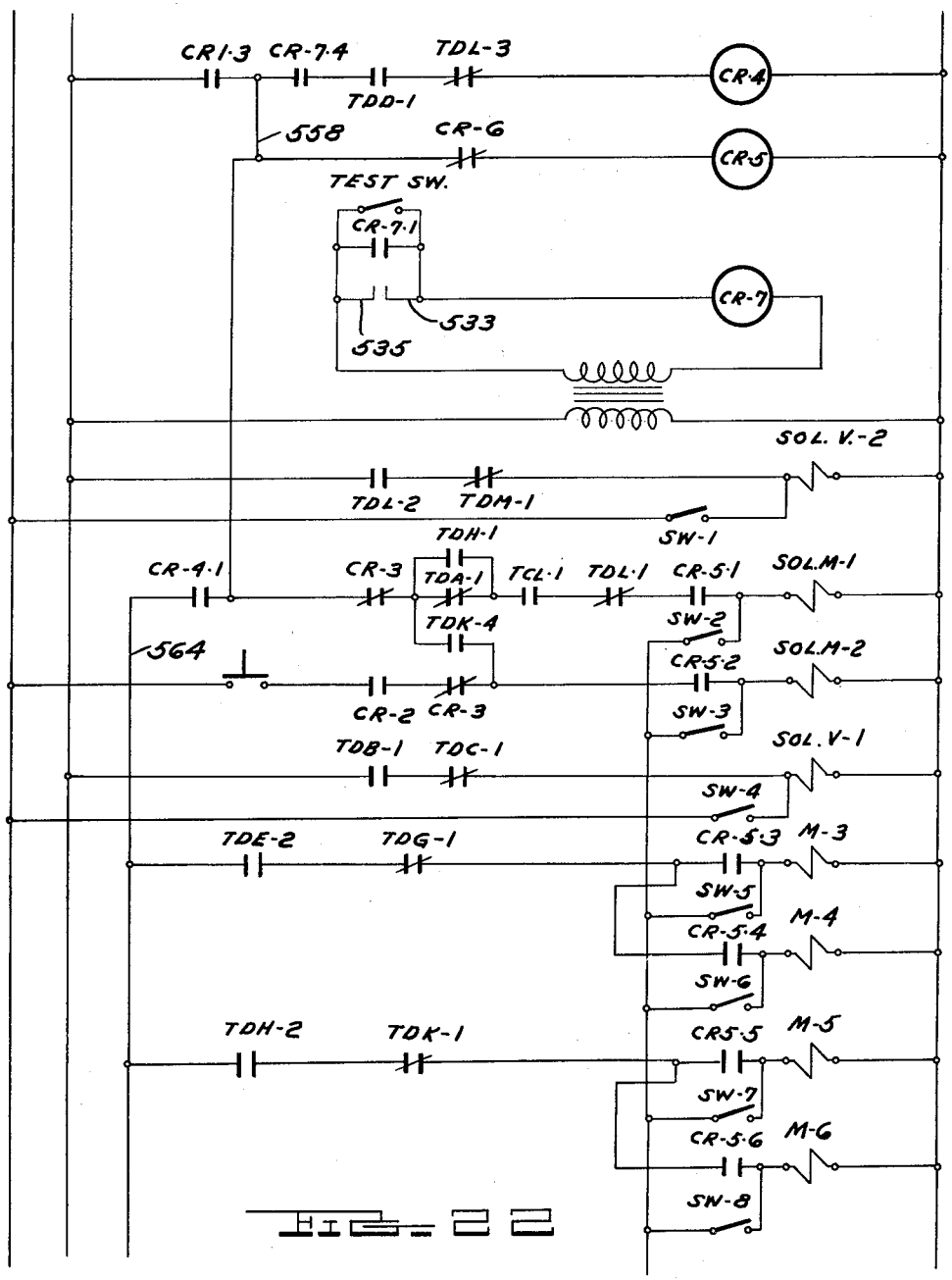

Burton & Parker
ATTORNEYS

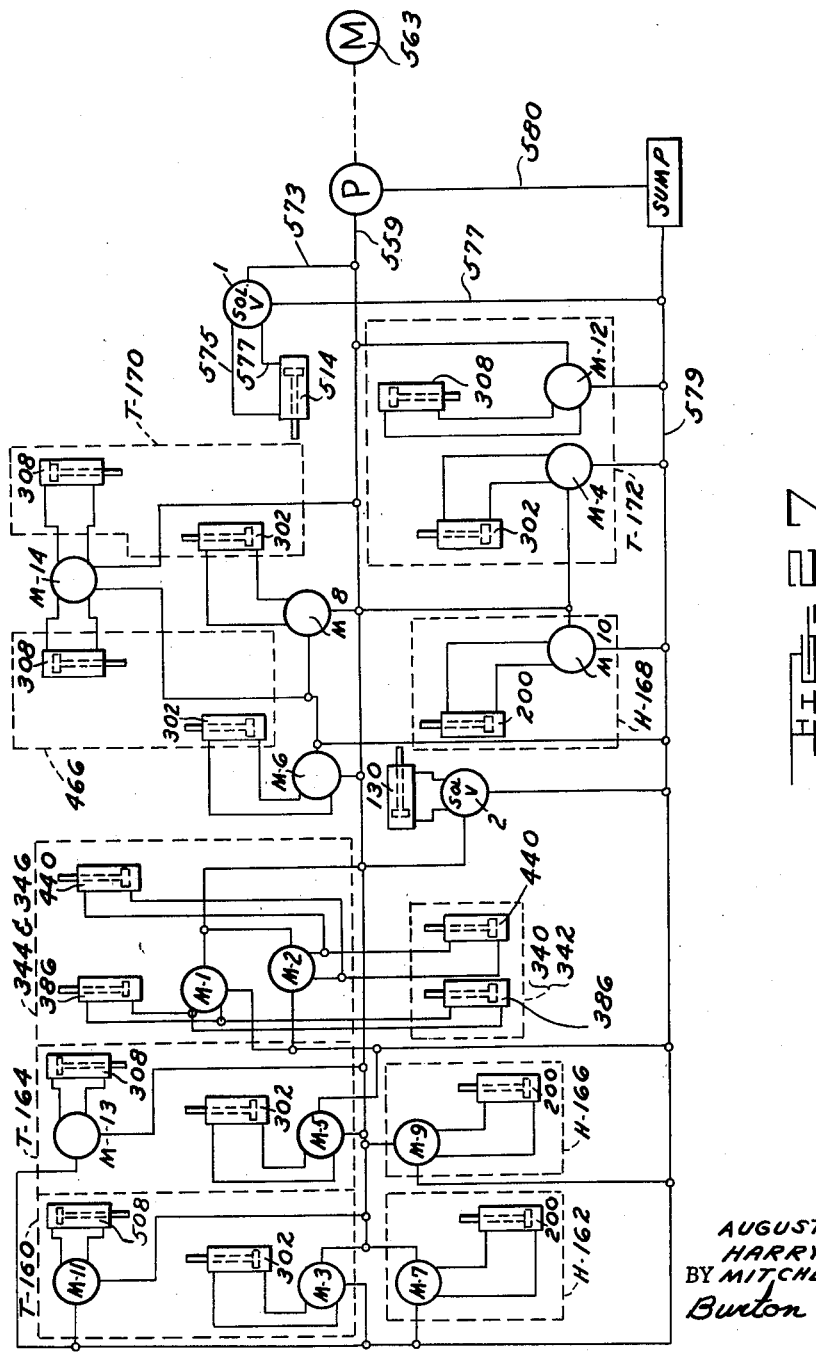

United States Patent Office 3,141,481
Patented July 21, 1964

3,141,481
METHOD OF AND APPARATUS FOR BENDING PREFORMED FORMED WIRE STRIPS
August T. Gonia, Western Spring, Harry H. Fante, Riverside, and Mitchell J. Shepard, Berwyn, Ill., assignors to Rockwell Standard Corporation, a corporation of Pennsylvania
Filed Aug. 9, 1957, Ser. No. 677,351
20 Claims. (Cl. 140—71)

This invention relates to a method of and apparatus for bending preformed formed wire strips into configurations adapted for use as springs in seat or back cushions for automobiles, furniture, and the like.

With the advent of "formed" wire strips, that is, sinuous wire strips comprising non-uniform loops of substantially greater width than the loops of conventional zigzag strips and unequal spacing along the strips, such as is shown in FIG. 24, new approaches needed to be devised in bending the preformed wire strips into configurations suitable for use as cushion springs. Heretofore various machines and methods have been employed to bend conventional preformed zigzag strips, but when these machines and methods were employed to bend preformed formed wire of a diameter, for example, of .148", substantial undesirable distortion of the strips occurred.

The formed wire strip before any bending is generally planar. To form a cushion spring, the end portions are usually bent at an angle out of the plane of the strip to form supporting portions at each end of what may be termed the seating or resting portion. To effect this bending the "torsion bars" or straight wire loop connecting portions at the junction of the end portions with the seating portion are twisted about their axes. Following this twisting the supporting portions should lie at simple acute or obtuse angles with respect to the seating portions. However, the distortion above mentioned frequently results in the supporting portions lying at a compound angle with respect to the seating or resting portion of the strip. This results partially from a loop adjacent the straight-wire loop-connecting portion being twisted, "opening" and thereby throwing the supporting portion angularly beyond the lateral edges of the strip and out of alignment with the seating or resting portion. This type of distortion may be termed planar distortion and is discussed in our co-pending application, Serial No. 667,432 filed June 24, 1957, now Patent No. 3,104,685. The compound angle between the resting and supporting portions is also caused in part by what may be termed non-planar distortion, wherein the straight wire portion being twisted is distorted either upwardly or downwardly, depending on the direction of the twisting, out of the plane of the strip. This also is discussed in said co-pending application.

Because of the spring-like character of the wire from which the strips are made, it is necessary to "overtwist" a straight-wire portion such that when it is released it will "untwist" to the final shape desired. If a supporting portion is to assume a final angle of, say, 170° relative to the seating portion (measuring the arc through which the supporting portion is bent), it may actually be necessary to twist the straight-wire portion connecting the resting or seating portion through an angle of, say, 180° in order to overtwist sufficiently. Because a twist of this extent means a doubling back of the strip upon itself and even beyond, a problem arises in accomplishing overtwisting of this magnitude.

A primary object of the invention is the provision of a method of and a machine for bending preformed formed wire strips and wherein planar and non-planar distortion of the strip is corrected for during the bending. Non-planar distortion is corrected by an eccentric twisting of the straight-wire loop-connecting portions. Planar distortion caused by loops of the strip tending to "open up" is corrected by urging such loops toward a closed position thereby counteracting the opening tendency. This latter method of correction is accomplished by the provision of distortion-correcting means which, during twisting of a straight-wire loop-connecting portion, urges the bight of the loop adjacent such straight-wire portion in a direction tending to close the angle between the bight and the straight-wire portion being twisted.

Another object of the invention is the provision of a method of bending preformed formed wire in which overtwisting may be accomplished even though the end of the strip is swung against and overlaps the resting or seating portion of the strip. In carrying out such object the strip is loosely supported between the opposite ends at which the twisting is occurring, whereby as an end portion of the strip is swung around through an arc of such magnitude that the end portion is folded back against the loosely supported portion, the latter is free to give way permitting continued swinging movement of the end portion whereby the requisite amount of overtwisting may be accomplished.

Another object of the invention is the provision of a machine having a plurality of wire-twisting and holding heads arranged in rows along opposite sides of a wire strip to be bent, with the heads shiftable from an at-rest position wherein a strip previously bent may be discharged from the machine and a successive strip positioned to be bent, and including a wire-strip feeding magazine disposed above the rows of heads with guide means extending downwardly from the magazine to guide strips successively discharged from the magazine into proper position adjacent the rows of heads.

Another object of the invention is the provision of a machine in which each wire discharged from the magazine and dropped toward the wire-bending position between the rows of heads is first temporarily supported in a position immediately above the wire-bending position to dampen motion of the strip, and is thereafter dropped a short distance to the wire-bending position.

Another object of the invention is the provision of crimping means for imparting bends to the bight portion of loops of a formed wire strip, and which means, in association with the entire wire bending machine, is adapted to support a wire strip both in the motion-dampening position, heretofore mentioned, and the wire-bending position.

In one form of the crimping means opposed anvil and die members are individually supported for shiftable movement toward and away from a wire strip supporting and crimping position, with one of the members also being shiftable toward and away from the other member to bend the bight of a loop between the members.

In another form of the crimping means, when space in the machine will allow, a pair of wire embracing heads are disposed side by side to embrace longitudinally adjacent portions of the bight of a loop, with at least one of said heads being rotatable about an axis extending between the heads to bend the bight at a point lying on said axis between the heads.

In still another form of the crimping means, when space in the machine is extremely limited, the crimping means comprises a die member carried by a reciprocable and rotatable shaft with an anvil block supported on the shaft for reciprocation therewith but held against rotation and having a V-notch into which the die member urges the bight of a loop upon rotation of the die member.

A further object of the invention is the provision in a machine for bending a preformed formed wire strip at longitudinally spaced apart intervals along the strip of means adapted to releasably engage one end of a formed wire strip in the machine while the opposite end is held fixed, and stretch the strip slightly to assure proper location of the loops with respect to a plurality of wire embracing heads in the machine arranged along opposite sides of the strip and which shift inwardly to embrace determined loops. Said means are adapted to indicate to the control mechanism of the machine as to the presence or absence of a formed wire strip in the machine and in proper position to be embraced by the heads.

Other objects, advantages and meritorious features will more fully appear from the following specification, attached claims and accompanying drawings, wherein:

FIG. 1 (sheet 1) is a top view partially in section, and with the wire feed magazine removed for clarity, of a machine embodying our invention;

FIG. 2 (sheet 2) is a cross sectional view taken on the line 2—2 of FIG. 1 and showing the wire strip feed magazine;

FIG. 3 (sheet 2) is a cross sectional view taken on the line 3—3 of FIG. 2 through one of the crimpers;

FIG. 4 (sheet 3) is a cross sectional view taken on the line 4—4 of FIG. 1 looking at one end of one of the crimping assemblies;

FIG. 5 (sheet 3) is a cross sectional view taken on the line 5—5 of FIG. 1 looking at the opposite end of the crimping assembly shown in FIG. 4;

FIG. 6 (sheet 4) is a cross sectional view taken on the line 6—6 of FIG. 1 showing a wire-twisting assembly in section and a side view of an associated wire-holding head;

FIG. 7 (sheet 5) is a cross sectional view taken on the line 7—7 of FIG. 1 through a wire-holding assembly and showing a side view of an associated wire-twisting head;

FIG. 8 (sheet 5) is a cross sectional view taken on the line 8—8 of FIG. 6 showing one of the compensator camming plates;

FIG. 9 (sheet 6) is a side view of the wire stretcher taken along the line 9—9 of FIG. 1;

FIG. 10 (sheet 6) is a fragmentary view of the stretcher hook shown in FIG. 9 but with the hook reversed and opening downwardly instead of upwardly;

FIG. 11 (sheet 7) is a cross sectional view through the machine taken on the line 11—11 of FIG. 1;

FIG. 12 (sheet 7) is a view taken on the line 12—12 of FIG. 11 and showing an end of the rotary kinker;

FIG. 13 (sheet 8) is a side view of the wire strip feed magazine looking in the direction of arrow 13 in FIG. 11;

FIG. 14 (sheet 9) is a top view of the wire strip feed magazine;

FIG. 15 (sheet 6) is a cross sectional view taken on the line 15—15 of FIG. 13 and showing the wire strip ejecting mechanism in the feed magazine;

FIG. 16 (sheet 10) is a schematic perspective view of the drive mechanism for the wire crimping units;

FIG. 17 (sheet 10) is a top view partially in section of an arrangement of wire twisting and holding heads adapted to crimp a loop of a sinuous wire strip;

FIG. 18 (sheet 10) is a cross-sectional view taken on the line 18—18 of FIG. 17 and showing in dotted outline how one of the twisting heads may be rotated to crimp the loop received therein;

FIG. 19 (sheet 11) is a side view of a pair of cooperating twister and holder heads and illustrating the eccentric twisting of a wire strip to correct for non-planar distortion;

FIG. 20 (sheet 11) is a top view of a pair of wire twisting and holding heads and illustrating the manner in which planar distortion is corrected;

Figure 23:
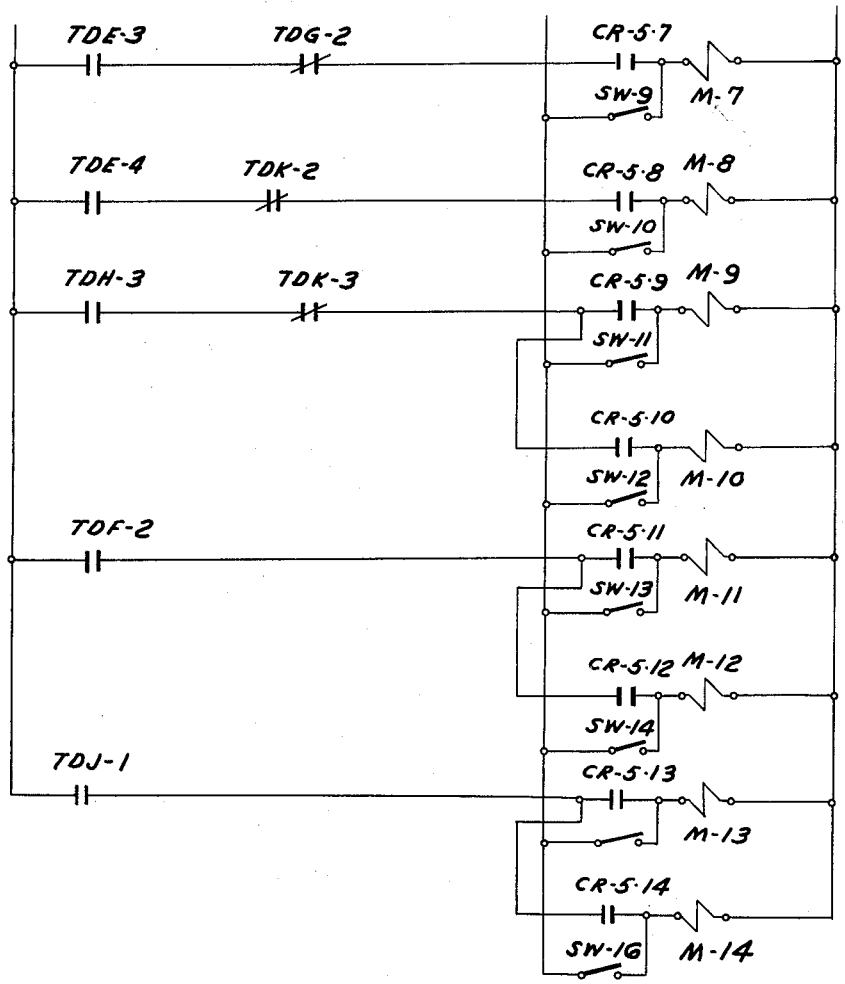

FIGS. 21, 22 and 23 (respectively sheets 12, 13 and 14) show a schematic wiring diagram for the electrical control circuits of the machine;

FIG. 24 (sheet 11) is a plan view of a formed wire strip prior to bending by the machine and method disclosed herein;

FIG. 25 (sheet 10) is a side view of a formed wire strip as it lies in the machine and illustrating how portions thereof intermediate opposite ends are free to give way beneath the ends of the strip being folded back upon the strip, thereby permitting overbending;

FIG. 26 (sheet 11) is a side view of one form a strip may assume following bending according to the method and apparatus herein disclosed; and, FIG. 27 (sheet 15) is a schematic diagram of the fluid pressure system of the machine.

In FIG. 24 is shown the top view of a preformed formed wire strip adapted to be bent by the method and apparatus herein described. It is to be understood that the strip shown is merely one of many different shapes and configurations of strips that may be bent by the machine and apparatus herein disclosed. The strip is bent to provide supporting portions at opposite ends comprising loops $L_1$–$L_4$, inclusive, and $L_{16}$–$L_{18}$, inclusive, as shown in FIG. 26, and inwardly of the supporting portions a seating or resting portion comprising loops $L_5$–$L_{15}$, inclusive.

General Arrangement and Operation

The preformed formed wire strips S to be bent are fed, one at a time, from a magazine M, see FIGS. 11 (sheet 7) and 13 (sheet 8) downwardly into the machine. They drop by gravity toward the wire-bending position WBP, but just above the wire-bending position, as at WBP′, see FIG. 6 (sheet 4), are arrested temporarily to permit a dampening of the motion imparted thereto by the dropping action. Following this, each wire is then permitted to drop through a short interval to the final bending position WBP. At the bending position, means SP engage opposite ends of the strip to stretch the same slightly thereby ensuring that the loops of the strip are held accurately in position to be engaged by the wire-twisting T and holding heads H and crimpers C arranged in rows along opposite edges of the strip. Thereupon the wire twisting and holding heads and crimpers shift toward and engage, bend and release the strip which is thereafter discharged from the machine. The straight wire loop connecting portions are twisted in successive operations commencing at the outer ends of the strip and working inwardly. When necessary to permit the required overtwisting, only those twisting and holding heads necessary to the twisting operation where the overtwisting occurs embrace the strip, while the strip inwardly of the heads is relatively free to give way as the strip doubles back on itself as shown in FIG. 25.

The bending of the strip is accomplished both by twisting straight-wire loop-connecting portions and by bending the bights of certain of the loops. Such latter bending is herein referred to as crimping and three different types of crimping mechanisms are shown and described.

The machine is fully automatic in operation and is provided with control mechanism determinging the sequence of operation of the various components of the machine and including timing mechanism which establishes time intervals during each of which certain operations are performed by the machine. In order to obtain the highest efficiency of operation of the machine, i.e., bend the greatest number of strips in the smallest amount of time, the length of each time interval is only just sufficient for the mechanical movement of that component of the machine which operates during the interval. Whether all the twisting and holding heads simultaneously engage the strip or whether only preselected heads first engage the strip, bend it and retract and then the remaining heads engage the strip to bend it, and whether the heads are in engagement with the strip at the time the crimpers crimp the strip, is all determined by the presetting of the control mechanism of the machine. Such control mechanism may be preset to operate the machine in different sequences of crimper and head movements.

Frame

The machine, as shown in FIGS. 1, 6, 7 and 14, includes a frame 30 comprising a pair of upright side members 32 and 34 which rest at their lower ends (not shown) on the floor. Each side member may include one or more reinforcing webs 36. The side frame members are held in spaced-apart relation by spacing sleeves 38 extending therebetween through which bolts 40 extend with nuts 42 overlying the outside of the side frames. A pair of magazine-supporting members 44 and 46 extending transversely of the frame are secured as by studs 48 to the upper edges of the side frames as shown in FIG. 14. Extending longitudinally of each side frame member and spaced below the upper edge thereof are a pair of vertically spaced-apart outwardly opening T-slots 50 and 52. Disposed substantially equidistantly between each pair of slots is a longitudinally extending slot 54 through which the wire-twisting and holding head supporting shafts extend. The T-slots support the wire-twisting and holding heads and associated actuating means on the side frames for adjustable movement longitudinally of the frames to accommodate the machine to handle different shapes of preformed formed wire strips. Wire crimping devices are also supported on the side frames as hereinafter described.

Wire Feed Magazine

The wire feed magazine M, shown in FIGS. 2, 6, 11, and 13–15, is adapted to successively feed wire strips one after another to the wire-twisting and holding heads and crimpers. It is mounted atop the machine and the strips drop therefrom by gravity to the wire-bending position WBP. Guiding means extending downwardly from the magazine guide each strip toward the heads and crimpers.

The magazine comprises a trough having a pair of side walls 56 and 58 which are supported spaced apart by the width of the wire strips upon the transversely extending frame members 44 and 46 to which the side walls are secured in any convenient fashion. Opposite ends of the trough are closed by end walls 60 and 62. A pair of open-sided chutes 64 and 66 are disposed one at each end of the trough between the side walls thereof and are secured as shown in FIG. 9 to the transversely extending frame members 44 and 46 by bolts or the like 68. Each chute includes a pair of spaced-apart side walls 70 and 72 between which the end loops of wire strips in the magazine are received to center the ends of the strips between the walls of the magazine. The sides of each chute are connected together by a back wall 74 which angles downwardly and inwardly so that as a strip drops out of the trough, its longitudinal position may be determined. The upper edge of each of the back walls 74 of the chutes may be folded to overlie the upper surface of the transversely extending frame members 44 and 46 so that the bolts 68 may pass through the chutes securing them to the frame.

The bottom of the trough is provided with means for supporting a stack of wire strips in the trough, with such means being adapted to permit the lowermost wire strip of the stack of strips to be discharged downwardly from the trough upon longitudinal shifting of the strip a determined amount. Such supporting means in the bottom of the trough comprises a plurality of floor or supporting portions 76, 78, 80, 82 and 84 shown in FIG. 14, secured to the side walls 56 and 58 of the trough, and upon which rests the lowermost strip of a stack of strips in the trough. Such floor portions may be secured to the side walls of the trough as by means of screws or the like 86 as shown in FIGS. 2 and 11. It will be observed in FIG. 14 that the floor portions are so disposed with respect to the lowermost strip of a stack of strips in the trough that upon shifting of the strip to the right, or, in other words, in the direction of the arrow, the strip will be shifted beyond the right-hand edge of each floor portion and free to fall out of the trough.

Ejecting means J are adapted to engage the lowermost strip of a stack of stripes in the trough and shift the same to the right to move the strip off the floor portions permitting the strip to drop from the trough. Such ejecting means includes a finger 88 which is received within one of the loops of the lowermost strip of the stack of strips in the trough and which, upon shifting to the right, engages the lowermost strip and urges it off of the supporting floor of the trough to permit the strip to drop therefrom. Actuating means for the finger are coupled therewith and upon receiving a signal from the timing mechanism controlling operation of the machine, the actuating means shifts the finger to discharge one strip from the trough.

As shown in FIGS. 2 and 13–15, the ejecting finger 88 is generally L-shaped and is adapted to extend into one of the loops of the lowermost wire strip of a stack of strips in a trough with the offset end 90 operable to engage the straight-wire loop-connecting portion at the right-hand side of the loop within which the finger is received. The loop within which the finger is received is indicated as loop $L_{10}$. This loop of each strip of the stack of strips in the trough is received over a positioning block 92 which substantially fills the loop between the straight-wire portions at the sides of the loop to position the strips longitudinally in the trough. Such block is held to wall 58 of the trough by means of screws or the like 94. The bottom surface 96, see FIGS. 2 and 13, is cut away as at 98 to terminate above the floor portions of the trough a distance substantially equal to the thickness of one wire strip, with the finger 88 underlying in juxtaposition the bottom surface 98. A portion of the block out beyond the finger 88, as shown in FIGS. 2 and 15, abuts a floor plate 100 and is secured thereto as by screws 102. The floor plate 100 is secured as by screws 104 to the lower edge of the side wall 58 of the trough. Such floor plate supports the right-hand edge of loop $L_{10}$ of the lowermost strip of the stack until the lowermost strip is shifted to the right beyond the right-hand edge of the floor plate. The finger 88 sweeps the floor plate to carry loop $L_{10}$ therefrom to permit the strip to drop.

The finger 88 is supported by a bracket 106, as shown in FIGS. 2 and 14, which is secured as by bolts 108 to the side wall 58 of the trough. The bolts 108 extend through a plate 110 disposed between the bracket and the side wall 58. This plate 110 may be secured as by welding at 112 to the side wall 58. The finger is supported for swingable movement about a vertical axis and for this purpose is secured as by screws 114 to the lower end of a lever 116 which is pinned as at 118 to a vertically extending shaft 120 carried by outwardly extending web portions 122 and 124 of the bracket. Web portions 122 and 124 are vertically spaced apart to receive therebetween a lever arm 126 pinned as at 128 to shaft 120. A fluid pressure cylinder 130 supported by brackets 132, bolted at 133 to the plate 110, is provided with a piston rod 134 which connects by a pivot pin 136 and bifurcated member 138 with the lever arm 126. Upon extension of piston rod 134 from the position shown in FIG. 14, the finger 88 is swung clockwise to eject the lowermost wire of a stack from the trough, and upon the retraction of the piston rod, the finger is correspondingly retracted to permit the next superjacent strip of the stack to drop to the position theretofore assumed by the strip previously ejected. An adjustable stop 140 is adapted to limit the ejecting swing of the lever 116 carrying the finger.

Means are provided for guiding strips over the upper end of block 92 and ensuring that only one strip at a time is discharged from the magazine by finger 88. Such means comprise, as shown in FIGS. 13–15, a vertically extending guide plate 141 secured in any convenient fashion to the trough side wall 56. The plate is spaced from the block a distance just exceeding the diameter of the wire from which the strip is formed and is rounded at the upper edge at 142 to guide straight wire portion $L_{10}$–$L_{11}$ between the block and plate. The lower edge of plate 141 terminates just above the lowermost wire strip of the stack of strips received in the trough. The plate 141 prevents all but the lowermost strip of the stack from shifting longitudinally and thereby accidentally discharging from the magazine. However, upon actuation of finger 88, the lowermost strip is shifted beneath plate 141 and beyond the edges of the supporting members 76, 78, 80, 82 and 84 and drops out of the magazine.

A pair of vertically extending rods 146 secured to the magazine by webs 147 serve to position the strips in the magazine trough. A vertically extending guide rod 148 cooperates with the left hand rod, see FIG. 14, to position loop $L_3$ therebetween.

Means are provided for guiding each strip as it is discharged from the trough downwardly toward the wire-bending position. Such means ensures that when the strip reaches the position WBP', shown in FIG. 6, it will be substantially in alignment with and directly above the position it will assume when disposed to be engaged by the wire-twisting and holding heads and wire crimpers. Such means includes a downwardly extending rod 150 supported by web 151 on a side wall of the trough and loop $L_9$ is adapted to embrace the rod as shown in FIG. 14. Rod 150 extends through the trough and downwardly to and through the wire bending position as shown in FIG. 13. Such means, in addition, includes a downwardly extending guide member 153 L-shaped in cross section which is supported by a bracket 154 welded or otherwise secured to the side wall 56 of the trough as shown in FIG. 14. Such means also includes a flat spring guide member 155 secured as by screws 156 to side wall 56 of the trough and terminating immediately above the wire kinking device shown in FIG. 11. The screws 156 are threaded into a vertically extending rod 157.

Means are provided for increasing the capacity of the magazine and for facilitating the loading of wire strips thereinto. Such means include a pair of upwardly extending rods 158 secured by webs 159 to the frame member 32 and bent to extend angularly upwardly from the magazine. Wire strips are stacked on these rods with the loops $L_4$ and $L_{14}$ received over the rods. As the stack of strips in the trough is depleted, the strips on the rods feed down into the trough. Because of the inclined position of the rods and the fact that they extend over one side of the machine, it is easy for the operator of the machine to load strips onto the rods for feeding into the magazine. Because of the inclined position of the rods, the strips will feed therealong automatically because of their own weight and the natural vibration of the machine.

*Wire-Twisting and Holding Heads*

Arranged in rows along opposite edges of a strip in the wire-bending position are a plurality of wire-twisting and holding heads. The reference numerals for the twisting heads are prefixed by the letter "T" while for the holding heads prefixed by the letter "H," the heads being indicated at 160, 162, 164, 166, 168, 170 and 172 in FIG. 1. Each wire twisting head is supported by a wire twisting unit, and each wire holding head is supported by a wire holding unit. These units are mounted on the frame of the machine and shift the heads reciprocally from an at-rest position retracted away from a wire strip to a position embracing determined loops of the strip. The wire twisting units are capable of rotating and twisting heads to bend straight-wire loop-connecting portions of the strip. The wire-holding units resist rotation of the holding heads. The wire-twisting and holding heads are of similar construction but the wire-twisting units are of a different construction than the holding units.

A typical wire-holding head and its supporting unit are shown in FIGS. 7 and 11. As shown in FIG. 7, the unit includes a bracket 176 secured by bolts 178, the heads of which are received in the T-slots 50 and 52, to the side frame 32 of the machine. The bracket is provided with a boss 180 which extends into the longitudinally extending slot 54, and a bearing 182 is seated in the boss. The bearing carries a head-supporting shaft 184 which is received within a socket formed in connector 186 with a pin 188 securing the shaft to the connector. The bottom 190 of the socket abuts the end of the shaft. Outwardly of the socket the connector has a bifurcated portion embracing one arm of a bell-crank lever 192 and connected thereto by pin 194. The bell-crank lever is pivotally supported as at 196 upon bracket 176. An angularly upwardly extending arm 198 of bracket 176 carries a vertically disposed fluid pressure cylinder 200 connected by bolts 202 to the arm and provided with a downwardly extending piston rod 204 which is connected by a pin 206 to the other end of the bell-crank lever 192. Upon retraction of piston rod 204 into cylinder 200, the shaft 184 is drawn outwardly to retract the head away from a wire-engaging position and toward the at-rest position. The tines of the bifurcated portion of connector 186 closely overlies opposite sides of the bell-crank lever adjacent pin 194 whereby rotation of the head is prevented.

As shown in FIG. 11, the inner end of shaft 184 is threaded as at 208 and the head is slidably received in non-threaded engagement thereover. Rotation of the head relative to the shaft is prevented by a key 210 received within cooperating grooves in the shank 212 of the head and in threaded portion 208 of the shaft. The inner end of the shaft is bored and tapped as at 214 and a bolt 216 threaded thereinto bears at the underside of its head against a plate 218 seated against a shoulder 220 within the head urging the head against a lock nut 222 threaded on portion 208 of the shaft. It is apparent that by means of bolt 218 and lock nut 222, the axial position of the head on shaft 184 may be varied.

Each wire-holding head includes a wire-embracing channel-shaped portion 224 having vertically spaced-apart side walls 226 and 228 integrally connected by a bottom portion 230. The channel formed between the sides 226 and 228 may be closed at the ends by walls 232 and 234 as shown in FIG. 1 to prevent a loop embraced by walls 226 and 228 from shifting in a direction longitudinally of the strip or channel.

The wire-embracing portion of the head is connected by a screw 242 to an adjustment plate 240, whereby the wire-embracing portion may be adjusted transversely of the axis of shaft 184 to counteract or correct for non-planar distortion of the strip during the bending thereof. In order to effect such adjustment, the wire-embracing portion of the head is dovetail-connected to the shank portion 212 of the head as shown in FIGS. 1 and 11. The shank portion is provided with a dovetail slot 241 extending vertically transversely of the axis of shaft 184. The wire-embracing portion is provided with a dovetail end 236 formed on plate 240 which is received in the dovetail slot. A pair of screws 238, threaded through the wire-embracing portion and bearing against the bottom of the dovetail slot, urge the wire-embracing portion away from the bottom of the dovetail slot thereby locking the wire-embracing dovetail end portion within the slot.

A typical wire-twisting head and its supporting unit is shown in FIG. 6, viz: head T–164. The unit includes a wire-embracing channel-shaped part 256 of the same general construction as the wire-embracing part 224 heretofore described in connection with the holding head H–168. As shown in FIG. 1, its shape is such as to adapt it to the loop which it embraces. Part 256 is connected to a plate 258 in the same fashion as is part 224 connected to plate 240, and part 256 is adjustable transversly of the axis of the shaft 260 in the same fashion as is part 244 adjustable relative to the axis of shaft 184. Head T-164 is adjustable axially of shaft 260 in the same fashion as is head H-168 adjustable axially of shaft 184.

Shaft 260 is supported for rotation on the frame of the machine by a bracket 262 having a boss portion 264 extending through the longitudinal slot 54 in the side frame 34 of the machine. Bolts 266, the heads of which are received within the T-slots 50 and 52, secure the bracket to the side frame 34. A sleeve bearing 268 is received in boss 264 of the bracket to support the shaft 260 for rotation and reciprocation. The outer end of the shaft is supported within a bearing 270 in the bracket. Connected by pin 272 to the end of shaft 260 is the member 274 having oppositely opening sockets and a shoulder 276. A collar 278 received over shaft 260 and bearing against shoulder 276 and threaded as at 280 is threadedly coupled with a part 282 having a bifurcated end 284 through which extends a pivot pin 286. A ball bearing 288 disposed in the outwardly opening socket of part 274 and bearing against the bottom of the bore 290 permits rotation of shaft 260 relative to part 282 with a minimum of friction despite axial thrust transmitted from part 282 to shaft 260.

Pivotally connected to the bifurcated end 284 of part 282 is the bell crank lever 292 pivotally supported as at 294 on an outwardly extending arm 296 of bracket 262. The other end of the bell crank lever is pivotally connected as at 298 to the upper end of piston rod 300 received in fluid pressure cylinder 302. Cylinder 302 is secured as by bolts 304 to an arm 306 of the bracket. Upon extension of piston rod 300 the head T-164 is retracted from a position engaging a wire strip toward an at-rest position and vice versa.

In order to effect rotation of the head, a fluid pressure cylinder 308 secured as by bolts 310 to an upwardly extending arm 312 of bracket 262, is provided with a piston rod 314 which is connected to a rack bar 316 in turn engaged with pinion gear 318 pinned as at 320 to shaft 260. The rack bar 316 is received within a channel 322 formed in the bracket and closed by a plate 324. The rack bar is connected to piston rod 314 by means of a threaded connection with a lock nut 326 locking the connection. A block 328 secured in any convenient fashion at the lower end of channel 322 has a threaded pin 330 received therethrough with a lock nut 332 locking the pin in place. The pin serves as a stop to limit rotation of the rack bar and may be adjusted to determine the amount of twist imparted to a straight-wire loop-connecting portion of the strip.

*Distortion Correction*

As mentioned above and in our co-pending application Serial No. 667,432 filed June 24, 1957, planar distortion is the result of one or more loops of the strip tending to open slightly such that the transversely extending straight wire portions, or what are sometimes referred to as "torsion bars," do not lie parallel at each side of the loop. For example, in FIG. 24 showing a plan view of a preformed strip, if loop $L_4$ is subjected to planar distortion during the twisting of straight wire portion $L_4$-$L_5$, angle A would open slightly, thereby throwing the supporting portion $L_1$, $L_2$, $L_3$ and $L_4$ longitudinally out of alignment with the remainder of the strip. With non-planar distortion straight wire portion $L_4$-$L_5$ is thrown out of the plane of the strip. The character of non-planar distortion is more fully discussed and illustrated in said co-pending application.

To correct for non-planar distortion the wire engaging portions 224 of the holding heads and 256 of the twisting heads are adjusted by way of the dovetail connection heretofore described to offset the wire engaging portion from the axis of rotation in a direction opposite the direction of distortion. Referring to FIG. 19, a holder is shown at H, the straight wire portion to be twisted at 335, and the axis of rotation of the twister T at $A_x$. If it is assumed the straight wire portion extending between the heads is distorted upwardly out of the plane of the strip upon rotation of the head, to correct for this the wire embracing portion is adjusted to a position slightly above the plane of the strip so that upon rotation it will move eccentrically to a position disposed beneath the strip as shown in dotted outline. This tends to counteract the upward distortion of the strip by intentionally distorting it in the opposite direction. Upon release of the strip the straight wire portion springs back to a position of co-planar alignment with the strip.

Means are also provided to correct for planar distortion and to eject the loops embraced by the heads following twisting of the strip. Such means is shown in FIG. 20 and comprises a cam plate 248 associated with each head and against which abuts an ejection pin or member 244. The pin extends through the bottom of the channel-shaped wire embracing portion of the head and abuts the bight of the loop received in the channel. A lightweight coil spring 245 encircles each pin, bearing at one end against the head of the pin and at the opposite end against the wire embracing portion of the twister or holder. Upon retraction of the twister or holder away from the wire strip, the pin is in effect extended into the wire-receiving channel of the head to eject the loop therefrom.

The camming plate is supported by a bracket 252 which is secured as by bolts 254, see FIG. 1, to the frame of the machine. The shanks of the twister and holder heads extend through the camming plates. The plates associated with the twisters are provided with a camming surface 336 the low point of which is disposed to permit full retraction of the pin from the wire embracing channel of the head when the twister is in its initial wire-receiving position prior to rotation. In the drawings the camming plates associated with the holding heads are shown as provided with a camming surface but such need not be the case.

The camming surfaces 336 of the plates associated with the twisting heads are of such slope that upon rotation of the twisting heads the pin 244 of each sweeps the camming surface of the plate and in so doing is extended into the wire embracing channel of the head to urge the bight portion of the loop in the channel in an outward direction relative to the channel, thereby tending to close angle A between the bight of the loop and the straight wire portion being twisted, as shown in FIG. 20. As twisting head T-160 rotates, the angle A between loop $L_2$ and the straight wire loop connection portion $L_2$-$L_3$ tends to close thereby counteracting distortion of the strip tending to open angle A. The camming surface 336 is so rotationally positioned with respect to the starting position of each twisting head that the projecting of the pin into the wire-embracing channel of the head progressively increases during the rotation of the head.

Upon retraction of a wire-twisting head, and assuming that the same has twisted a straight-wire loop-connecting portion of the strip, the loop is tensioned within the wire-embracing channel of the head such that there is a tendency for the loop to remain in the channel, but with the pin 244 abutting the camming surface 336, as the head retracts, the loop is forced out of the loop-embracing channel of the head. Following retraction of the head and as the same rotates back to its starting position, the spring encircling each pin 244 compels the pin to follow the camming surface 336 so that the pin is, in effect, retracted relative to the loop-embracing channel, and upon extension of the head toward the strip resumes the position shown in FIG. 1.

*Wire Crimping Devices*

Wire-crimping devices are provided for bending the bight portions of certain of the loops. Two different forms of these crimping devices are shown in FIG. 1, and another form in FIG. 17. The latter form comprises a pair of wire-twisting heads, viz: twisting heads T–174 and T–176 which jointly embrace the bight of loop $L_{16}$ in longitudinally spaced relation along the bight. These two twisters would be installed in the machine in place of twister T–170 shown in FIG. 1 and would impart a bend to the bight of loop $L_{16}$. The loop-embracing channels of heads T–174 and T–176 are closed at only one end, as at 338 and 339, and with the heads cooperating to bend loop $L_{16}$, as shown in FIG. 18. Upon rotation of twister T–176 clockwise while twister T–174 remains stationary, the bight portion of loop $L_{16}$ is crimped. In FIG. 18 in dotted outline is the position of the loop engaging portion of head T–176 after rotation. Of course head T–172 must be retracted prior to rotation of head T–174. The channel-shaped wire engaging portion of head T–174 is supported spaced axially from the dovetail connection by an arm 341. This permits the heads to be disposed close together. This form of the crimper serves to impart the kink $K_6$ in the loop $L_{16}$ of the strip as shown in dotted outline in FIG. 26. The axis of rotation of twister T–176, it will be noted, intersects the bight of loop $L_{16}$ at the point of the bend, such axis extending between the heads T–174 and T–176. Following rotation of T–176, it is retracted and T–174 is rotated to twist straight wire portion $L_{15}$–$L_{16}$.

In another form of the crimpers, two pairs of crimping units 340 and 342, and 344 and 346, are secured to the side frames of the machine. Because the pair 344 and 346 is of similar construction as pair 340 and 342, only the latter will be described in detail. Crimper units 340 and 342 are shown in opposite end views in FIGS. 4 and 5 and each includes a body casting or housing 350 which is secured by means of bolts 352 and 354 to the side frame 32 of the machine. The units are held in spaced-apart relation by means of a sleeve 356, see FIG. 1, extending between the units with a long bolt 358 having a nut 360 received thereon extending through the units and through the sleeve. Extending through the units is a shaft 362. Mounted on the shaft in each unit to swing within a notch 364 is an anvil arm 366. The arm is secured to the shaft by a set screw 368, the lower end of which is received in the shaft. From the shaft to the lower end of the arm it is provided with a bore 370 within which is received the anvil 372. A screw 374 may be adjusted to determine the amount of projection of the anvil below arm 366. The head of the anvil is shaped as shown in FIGS. 2 and 3 to provide a flat upper surface 376 and a V-shaped downwardly opening notch 378. A pair of pins 380 position the bight of a loop beneath the anvil head. A stop screw 382 having a lock nut 384 is threaded through the unit to abut at its inner end the upper end of the arm 366 and thereby limit the amount by which the head of the anvil may project toward a wire strip.

Shaft 362 is rocked by the action of fluid pressure cylinder 386 secured in any convenient fashion to the underside of unit 340. The cylinder is provided with a piston rod 388 having a bifurcated connecting part 390 coupled by a pin 392 to an upwardly extending link 394. Link 394 is connected as at 396 to an arm 398 secured to shaft 362 by a set screw or the like 400. It is apparent that upon extension of piston rod 388 the anvils 372 in each unit 340 and 342 will be retracted away from the wire strip while upon retraction of the piston rod the anvils will be extended.

The wire is bent over the anvil or, rather, into the V-shaped notch therein by means of a die 402. The die is provided with a head 404 shaped in cross section, as shown in FIG. 3, to provide a V-shaped edge 405 which urges the bight of a loop disposed thereupon into the V-shaped recess 378 in the anvil upon raising of head 404 relative to the head of the anvil. The die 402 is raised and lowered by means of a cam 406 disposed in each unit and secured upon a shaft 408, extending between and through the units, by means of a set screw 410.

The cam acts against an inclined surface 412 formed in the rear end of the die 402. A spring-loaded plunger 414 bearing against the underside of the die at the rear end thereof tensions the inclined surface 412 against cam 406. The die rocks upon a rib 416 which rests on a bearing pad 418. The die is shifted toward and away from the wire strip by means of a crank 420 having a ball-shaped end 422 received within a slot 424 formed in the body of the die. The crank is mounted on a shaft 426 which extends between and through the crimping units and out of the end of unit 342 as shown in FIG. 4. Outside of unit 342 an arm 428 is secured as by pin 430 upon the shaft. The arm is pivotally connected as at 432 to a link 434, in turn pivotally connected as at 436 to the upper end of a piston rod 438 associated with fluid pressure cylinder 440. Cylinder 440 is secured to the underside of unit 432 in any convenient fashion. Upon extension of piston 438 the dies 402 are retracted away from the wire strip, while upon retraction of the piston rod into the cylinder, the dies are extended toward the wire strip.

Shaft 408, upon which the cams 406 in each unit are mounted, extends longitudinally of the machine as shown in FIG. 1. There are two such shafts, shaft 408 for units 340 and 342 and shaft 408' for units 344 and 346. The outer ends of the shafts are supported in bearings 442 and 444 on the frame of the machine and on each shaft is mounted a sprocket 446 and 448 over which is entrained a chain drive 450 as shown in FIGS. 1 and 16. The chain is driven by sprocket 452 mounted on shaft 454 extending through an electrically operated brake 456 and connected to one side of an electrically operated clutch 460. The other side of the clutch is connected by shaft 462 to an electric motor 464 which when the clutch is engaged drives sprocket 452.

The electric brake and clutch are of conventional construction and need not be described in detail. The brake and clutch are shown schematically in FIG. 21 and their operation will be described in conjunction with the electrical circuits shown in FIG. 21. The purpose of the brake is to abruptly stop rotation of shaft 452 upon disengagement of clutch 460 and prevent rotation of the shaft while the clutch is disengaged. The clutch and brake are so electrically interconnected that simultaneously they respectively engaged and disengaged and vice versa. A limit switch LS–1 hereinafter described, and shown in FIG. 1, determines the amount of rotation of shafts 408 and 408'.

The third form of crimping mechanism is indicated generally at 466 in FIGS. 1 and 11. It comprises the supporting and driving mechanism of a wire twisting unit, but in place of the conventional twister head a special form of wire engaging head is provided. As shown in FIGS. 11 and 12 the wire twisting shaft 468 which extends, as does shaft 260 in FIG. 6, out of the twisting unit has a collar 470 pinned thereto at 472. An anvil block 474, rectangular in cross section and received over the end of the shaft to abut collar 470, is held against rotation with the shaft by a bracket 476, bolted as at 478 to the side frame 34 of the machine. The bracket has a bifurcated portion comprising parallel arms 480 and 482 which overlie opposite sides of the anvil block with a portion 484 of the block extending slidably between the arms.

The outer end of the anvil block is stepped as shown in FIG. 11 to provide a shoulder 486 having an upwardly opening V-notch 488 therein. The shoulder 486 is spaced from the front face of the block by a channel 490. Pinned as at 491, or otherwise secured to the end of shaft 468, is a semi-circular die 492 having an axially extending die portion 494 triangularly shaped in cross section and which upon rotation of shaft 468 clockwise, as viewed in FIG. 12, urges the bight of loop $L_{14}$ down into the upwardly opening V-notch in the anvil block to crimp the loop. Upon retraction of shaft 468 the anvil block and die 492 are retracted from the strip. Shaft 468 is rotated back to its starting position prior to such retraction. Those edges of die portion 494 and shoulder 486 which open into the channel formed between the parts are beveled as at 496 to guide loop $L_{14}$ into the channel as the crimper is projected from the at-rest position toward the strip.

Strip-Positioning Means

Means are provided for positioning each strip after it drops from the magazine for embracement of the loops by the wire-twisting and holding heads and the crimpers. As heretofore mentioned, the descent of the strip from the magazine is first arrested at a motion-dampening position just above the wire bending position. This initial rest position is indicated at WBP' in FIGS. 2, 6 and 7. The strip is supported in this position by the upper surfaces 376 of the anvil heads of the four crimping units 340, 342, 344 and 346 and by a finger 498 shown in FIGS. 1 and 6. The finger has a stepped rest block 500 in the step of which loop $L_5$ rests. The block has an arm portion extending upwardly within the body 502 of the finger, with the arm portion being secured therewithin by screws 504. The finger is clamped as at 506 upon shaft 362 which extends to a point above holder H–166 as shown in FIG. 1.

After the passage of a determined time interval the anvil heads of the two pairs of crimping units, as well as the finger, retract away from the strip thereby permitting the strip to drop a short distance to the wire bending position WBP. In the wire bending position the strip is supported by the die portions 404 of the two pairs of crimping units 340–346, and at the left hand end, as viewed in FIG. 1, by a plate 508 secured in any convenient fashion to a cross frame member 510. The plate is provided with an upstanding pin 512 over which loop $L_1$ drops.

The plate 508 and pin 512 comprise part of means SP for positioning the strip longitudinally in the wire bending position. A wire puller at the right hand end of the strip, as viewed in FIG. 1, comprises the remainder of means SP for positioning the strip longitudinally in the wire bending position. The puller includes a fluid pressure cylinder 514 shown in FIG. 9 (sheet 6) having a hook-shaped part 516 at the outer end of piston rod 518, with the hook-shaped part adapted to releasably engage the outside straight wire portion of loop $L_{18}$ to draw the loop against a positioning block 520 to slightly stretch the strip. With loop $L_1$ received over pin 512, and loop $L_{18}$ abutting block 520, proper longitudinal positioning of the strip in the machine is assured.

The puller not only properly locates the wire longitudinally in the machine for the bending operation, but also is connected in the control circuits of the machine in such fashion that unless the wire strip is properly positioned, further operation of the machine is interrupted. How this is accomplished is explained hereinafter, and only the constructon details of the puller are described at this time. The cylinder 514 rests upon a pair of electrical insulating pads 517 and 519 and is bolted as at 521 to a plate 522, in turn bolted as at 524 to the frame of the machine. The bolts 521 are electrically insulated from the plate by insulating collars 523. The hook-shaped part 516 is threadedly fastened to the end of piston rod 518 and extends between a pair of electrical insulating plates 526 and 528, see FIG. 1, secured to opposite sides of member 530 by bolts 531. Plates 526 and 528 prevent rotation of the hook. Block 520 is secured by bolts 532 to member 530, and is slotted as at 534 to permit hook 516 to be extended therethrough without touching the block.

After the strip drops to the wire bending position WBP, the cylinder 514 is pressurized to extend the piston rod from the solid outline position to a point lying to the left of dotted outline position 514–A. The curved nose of the hook pushes the outer straight wire portion of loop $L_{18}$ upwardly and the straight wire portion drops into the recess of the hook. The cylinder is thereafter reversely pressurized and the hook pulls loop $L_{18}$ back against block 520. When the outer straight wire portion of loop $L_{18}$ engages block 520 as shown in FIG. 9, an electrical circuit is completed between electric leads 533 and 535 connected respectively to the cylinder 514 and the frame member 522. Unless such circuit is completed by abutment of the outer straight wire portion of loop $L_{18}$, the operation of the machine is interrupted giving the operator an opportunity to correct the difficulty.

Upon twisting of the right hand end of the strip, loop $L_{18}$ is merely swung upwardly out of the hook. In the event the first twist at the right hand end of the strip is downward instead of upward, the hook is rotated relative to cylinder 514 through 180° and disposed as shown in FIG. 10.

To prevent the strip from catching on the twister or holder heads as it drops between the motion dampening posiiton WBP' and the wire bending position WBP, the heads may be provided with small guides 536 as shown on holding head H–168 in FIG. 7. This guide prevents the strip from coming to rest on top of the head, which may otherwise occur even though the head is retracted, and guides the strip down in front of the wire-receiving channel of the head.

General Operation

In the operation of the machine and the bending of a preformed formed wire strip according to the method herein disclosed, assume that the wire strip magazine contains a stack of formed wire strips. After the machine is started through the closing of certain electrical circuits hereinafter described, the lowermost strip of the stack of strips in the magazine is ejected from the magazine as finger 88 of the magazine ejector is actuated. The lowermost strip is shifted longitudinally to the right as viewed in FIG. 14 and drops downwardly toward the wire bending position, being guided in its descent by the chutes 74 at opposite ends of the magazine, and by downwardly extending rod 150, the guides 144 and 146 as well as guides 153 and 155, all shown in FIG. 13.

Prior to ejection of the lowermost strip from the magazine all of the wire-twisting and holding heads as well as crimper 466 have been retracted to the at-rest position withdrawn away from the wire bending position of a preformed strip. The anvil heads 372 of the four crimping units 340–346 are extended toward the wire bending position, as shown in FIG. 2, and the finger 498 is also extended toward the wire supporting position such that the anvils and finger catch the wire as it drops from the magazine and supports the wire upon the surface 376 of the anvils and within the step of the part 500 of the finger.

The control mechanism of the machine is arranged to allot determined time intervals during which each operation of the machine is performed and at the end of each time interval the next operation of the machine commences. Consequently at the time the magazine ejector finger 88 is actuated to eject a wire strip, a time interval commences to run that is of sufficient duration to allow the finger to eject a strip, permit the strip to fall to the motion dampening position, and permit the strip to come to rest in the motion dampening position before the strip is dropped to the wire bending position. At the expiration of the time interval necessary for the strip to drop to the motion dampening position and come to rest, the anvil heads 372 of the four crimping units 340–346, and the finger 498 are retracted to permit the wire to drop to the wire bending position WBP through a distance substantially equal to the vertical distance shown in FIG. 2. The strip is now supported on the dies 402 of the four crimper units 340–346 and at the left hand end upon the plate 508. Loop $L_1$ is received over pin 512.

The dropping of the strip from the motion dampening position to the wire bending position occurs during a time interval established by the control mechanism and upon expiration of such time interval the hook-shaped part 516 of the puller at the right hand end of the strip, as viewed in FIG. 1, is extended to engage the outer straight wire portion of loop $L_{18}$ and draw such straight wire portion back against block 520 to complete an electrical circuit permitting continued operation of the machine. With such electrical circuit completed and upon expiration of the time interval required for the operation of the puller, brake 456 is disengaged and clutch 460 is engaged to rotate shafts 408 and 408' one revolution to crimp the wire at $K_1$, $K_2$, $K_3$ and $K_4$, as shown in FIG. 26. This crimping occurs during a time interval which upon expiration causes twisters T–160, T–170 and T–172, as well as holder H–162, to extend inwardly toward the strip to embrace, respectively, loops $L_2$, $L_{16}$, $L_{17}$ and $L_3$ This extension of the twisters and the holder H–162 occurs during a time interval which upon expiration causes rotation of twisters T–160 and T–172 to twist loop-connecting portions $L_2$–$L_3$ and $L_{16}$–$L_{17}$ to bend the opposite ends of the strip upwardly.

In order to permit maximum twisting of portions $L_2$–$L_3$ and $L_{16}$–$L_{17}$, if such is necessary, it will be noted in referring to FIG. 25 that the wire strip is unsupported between respectively twister T–160 and crimper 340 and twister T–170 and crimper 346 such that intermediate these points the strip is free to give way beneath the ends of the strips being folded back upon such portions of the strip. In other words, as loop $L_1$ is folded back upon loop $L_4$, loop $L_4$ will give way beneath loop $L_1$. The same is true at the right hand end of the strip.

Upon expiration of the time interval for the rotation of twisters T–160 and T–172, such twisters as well as holder 162 retract away from the strip. In addition, the anvils 372 of crimping units 340–346 retract away from the strip and thereafter wire twisting head T–164 wire holding heads H–166 and H–168 extend in and embrace, respectively, loops $L_4$, $L_5$ and $L_{15}$. At the same time crimper 466 is extended to embrace loop $L_{14}$. Thereafter twisters T–164 and T–170 rotate to twist loop-connecting portions $L_4$–$L_5$ and $L_{15}$–$L_{16}$ to bend opposite ends of the strip downwardly. Such downward swinging of the ends of the strip may carry such ends back upon that portion of the strip intermediate which the twisting is occurring. Because anvils 372 of the crimping units have been retracted, such portion of the strip intermediate the points of twisting is free to give way upwardly ahead of the ends of the strip urged thereagainst, in the same fashion as does the strip give way beneath loops $L_1$ and $L_{18}$ in FIG. 25.

Crimper 466 is also actuated to crimp loop $L_{14}$. Such crimper and holders H–166 and H–168 as well as twisters T–164 and T–170 retract away from the strip and the strip is permitted to fall from the machine.

In the following description of the control system of the machine the operation of the machine is explained in greater detail in conjunction with the control system.

*Control System*

Before describing the arrangement and operation of the control system of the machine it will be assumed that a formed wire strip has been discharged from the magazine and is resting in the motion dampening position WBP' upon the upper faces 376 of the anvils of crimping units 340, 342, 344 and 346, and that all of the wire twisting and holding heads and the crimper 466 are at the at-rest position retracted from the wire strip.

FIGS. 21–23 (sheets 12–14) show the schematic wiring diagram of the electrical control circuits for the machine, and FIG. 27 (sheet 15) shows a schematic fluid pressure circuit for the machine. A source of 115 v. current is connected across terminals 550 and 552. A switch 554 may be actuated manually to prepare the machine for either manual or automatic operation. In the following description, and as shown in the drawings, the switch is in the position for automatic machine operation. Upon depressing the motor start button, see FIG. 21, the relay MS controlling motor 464 and pump motor 563 (sheet 15) is energized which closes switches in the electric lines (not shown) to the motors energizing the motors. MS is held energized by relay switch MS–1 connected across the start button as shown.

Upon pressing the machine start button, relay CR–1 is energized thereby actuating all of the CR–1 enslaved switches. In the drawings all switches are shown in the position they assume before energization of any of the relays. Slave switch CR–1.1 locks around the start button to keep relay CR–1 energized. Slave switch CR–1.2 closes the circuit to the electronic timing mechanism of the electrical control circuit. CR–1 also closes CR–1.3 in the circuits of relays CR–4 and CR–5. Energization of CR–5 closes slave switches CR–5.1 through CR–5.14. These enslaved CR–5 switches, which are normally open, serve to isolate, when open, the solenoid valves controlling the twisting and holding head actuating cylinders and the driving mechanism for the crimpers, from the automatic circuitry of the machine so that each twisting or holding or crimping function may be individually tested by closing toggle switches SW–1 through SW–16.

The electronic timing mechanism which is shown only schematically in the drawings, includes a plurality of electronic timing units: TCL, TDA, TDB, TDC, et cetera. They are so electrically interconnected that upon expiration of the time interval of one, the next unit will commence measuring a time interval. A stepping switch, not shown, also is a part of the timing mechanism. Each timing unit controls the operation of one or more slave switches. These switches are either opened or closed upon the timing unit commencing the measurement of its time interval, and remain in the position to which actuated after the time interval expires and until the unit is returned to "Zero time." The units are shown by boxes successively connected by leads 556 to schematically illustrate the dependency of each unit for commencement of its timing function upon the expiration of the time interval of the preceding unit. This timing mechanism is available upon the market and need not be further described. Only its general function in the control circuit is described.

Upon energization of TCL its enslaved switch TCL–1 is closed, and with CR–1.3 and CR–5.1 being closed, solenoid valve M–1, see FIGS. 22 and 27, is energized to cause pressurization of fluid pressure cylinders 386 of the two pairs of crimping units 340, 342 and 344, 346 to extend the piston rods 388 thereof and cause retraction of the anvils 372, see FIG. 5, sheet 3, and retraction of finger 498, to permit the wire strip to fall to the wire bending position WBP resting on the die portions 404 of the two pairs of crimping units and upon the plate 508 at the left hand end of the machine as viewed in FIG. 1.

Each solenoid valve hereinafter mentioned which controls pressurization of one or more of the fluid pressure cylinders, is spring held in one position causing pressurization of one end of the cylinder which it controls, and upon energization is shifted to another position pressurizing the opposite end of the cylinder and venting the end theretofore pressurized, to exhaust. In the fluid pressure circuit diagram the pump, though a main pressure line 559 supplies each valve by a branch, such as branch 573 for solenoid valve 1, the valve being connected by two lines 575 and 577 to opposite ends of cylinder 514, with an exhaust line 577 draining to a common return line 579 returning the exhausting fluid to a sump. A supply line 580 passes fluid from the sump to the pump.

The time interval measured by each of the timing units TCL, TDA, TDB, et cetera, individually is adjustable, and for maximum efficiency is only long enough to permit operation of that function of the machine it controls. For example, TCL is adjusted so that its time interval is only just sufficient to permit retraction of the anvils of the two pairs of crimping units and permit the strip to drop to the wire bending level in the machine before TCL times out and energizes unit TDA which in turn immediately initiates the next step in the machine operation.

Upon energization of unit TDA, enslaved switch TDA-1 is opened de-energizing solenoid valve M-1 thereby causing the anvils 372 of the crimping units 340, 342, 344 and 346 to return to their crimping position shown in FIG. 2 (sheet 2).

Timing unit TWA now times out and energizes unit TDB which in turn closes enslaved switch TDB-1 thereby energizing solenoid valve 1. Valve 1 is in the fluid pressure circuit of the wire locator or puller cylinder 514 and upon energization causes extension of piston rod 518 to engage the hook-shaped part 526 with the wire strip.

Timing unit TDB now times out energizing unit TDC. TDC opens enslaved switch TDC-1 thereby deenergizing solenoid valve 1 causing piston rod 518 in the puller cylinder 514 to retract stretching the wire strip and pulling the outer straight wire portion of loop $L_{18}$ against block 520, see FIG. 9. This completes an electric circuit between leads 533 and 535, see FIGS. 9 and 22, thereby energizing relay CR-7. CR-7 closes enslaved switch CR-7.1 to lock up around the circuit between leads 533 and 535, and also closes CR-7.2 in the circuit to relay CR-1 around enslaved switch TDD-2 of timing unit TDD. CR-7 also closes switch CR-7.3 in the circuit of relay CR-3. CR-7 also closes switch CR-7.4 in relay circuit CR-4.

TDC now times out energizing timing unit TDD which in turn closes enslaved switch TTD-1 energizing relay CR-4. CR-4 relay closes enslaved switch CR-4.1 in electric lead 564, see FIG. 22, thereby permitting energization of the solenoid valves controlling operation of the twister and holder units and crimpers. Because switch CR-4.1 will not be closed unless the wire strip abuts block 520, and because such switch must be closed in order to allow energization of the solenoid valves controlling operation of the twisters, holders and crimpers, it becomes apparent that the puller acts as a safeguard against the machine attempting to bend a wire strip improperly positioned in the machine.

TDD times out energizing timing unit TDE, which in turn closes switch TDE-1 in the circuit of relay CR-3 energizing such relay. Relay CR-3 closes slave switch CR-3.1 and opens switch CR-3.2 thereby respectively energizing and de-energizing the clutch 460 and the brake 456 which cause crimper shafts 408 and 408′ to make one revolution. The rotation of these shafts is limited to one revolution by a limit switch LS-1 actuated by a cam or other tripping device on one of the shafts. In FIG. 1 limit switch LS-1 is shown actuated by a projection 568 on shaft 408. When normally closed switch LS-1 is opened, the circuit to relay CR-3 is broken, de-energizing the relay, which in turn closes switch CR-3.1 and opens switch CR-3.2 to disengage the clutch and apply the brake.

Timer TDE also closes enslaved switches TDE-2, TDE-3 and TDE-4, respectively, in the solenoid valve circuits for valves M-3, M-4, M-7 and M-8. Solenoid valves M-3, M-4 and M-8 control, as shown in FIGS. 24 and 25, sheets 15 and 16, the admission of fluid pressure to cylinder 302 of the twister units for heads T-160, T-170 and T-172, and solenoid valve M-7 control cylinder 200 of the actuating unit for holder H-162. Upon energization of these solenoid valves fluid pressure is admitted to the respective cylinders to extend the wire twisting heads T-160, T-170, T-172 and holding head 162 inwardly to embrace respectively loops $L_2$, $L_{16}$, $L_{17}$ and $L_3$.

Timer TDE thereupon times out and energizes timer unit TDF which in turn opens slave switch TDF-1 in the circuit of relay CR-3, and closes switch TDF-2 in the circuits of solenoid valves M-11 and M-12. Opening of TDF-1 prevents recycling of the crimper during subsequent operation of the machine, bending the strip now in the wire bending position. Closure of TDF-2 energizes solenoid valves M-11 and M-12, pressurizing cylinders 308 of the twisting units supporting twisting heads T-160 and T-172, causing the heads to twist straight wire portions $L_2$–$L_3$ and $L_{16}$–$L_{17}$.

Timer TDF thereupon times out energizing timer unit TDG which in turn opens enslaved switches TDG-1 and TDG-2 respectively in the circuits of solenoid valves M-3, M-4 and M-7 causing retraction of twisters T-160, T-172 and holder H-162.

Timer TDG times out energizing TDH which in turn closes enslaved switch TDH-1 in the relay circuit of solenoid valve M-1 to energize this valve, causing reverse pressurization of cylinders 386 of the two pairs of crimping units 340, 342 and 344, 346 to retract the anvils 372 from above the wire strip. This will permit the strip to give way upwardly as the ends of the wire are thereafter twisted up beneath the strip. TDH also closes switches TDH-2 and TDH-3 in the circuits of solenoid valves M-5, M-6 and M-9, M-10, to energize such valves causing pressurization of cylinders 302 of twister unit T-164 and crimper unit 466 and cylinder 200 of holding units H-166 and 168, causing the respective heads to embrace loops $L_4$, $L_5$, $L_{14}$ and $L_{15}$.

Timer TDH times out energizing timer TDJ which in turn closes switch TDJ-1 causing energization of solenoid valves M-13 and M-14 which in turn pressurizes cylinders 308 of twisting units T-164 and T-170 causing the heads thereof to rotate to twist straight wire portions $L_4$–$L_5$ and $L_{15}$–$L_{16}$. Valve M-14 also pressurizes cylinder 308 of crimper 466 causing rotation of the die portion 494, see FIG. 12 (sheet 7) to crimp loop 14.

Timer TDJ thereupon times out energizing timer TDK which in turn opens enslaved switches TDK-1, TDK-2 and TDK-3 in the circuits of solenoid valves M-5, M-6, M-8, M-9 and M-10, thereby de-energizing the valves and causing reverse pressurization of cylinder 302 of twister units T-164, T-170 and crimper unit 466, and reverse pressurization of cylinder 200 of holding units H-166 and H-168. TDK also closes switch TDK-4 in the circuit of solenoid valve M-2 thereby energizing such valve and causing pressurization of cylinder 440 to effect retraction of the dies 404 of crimper units 340, 342, 344 and 346. As all the wire holding and twisting heads and crimpers have now retracted from the strip, the same falls from the machine and may be carried away therefrom in a suitable conveyor, not shown.

Timer TDK thereupon times out energizing timer TDL which in turn opens enslaved switch TDL-1 in the circuit of solenoid valve M-1 causing pressurization of cylinders 386 of crimper units 340, 342, 344 and 346 to extend the anvil 372 to the position ready to receive and support the next wire strip discharging from the magazine. TDL also closes switch TDL-2 in the circuit of solenoid valve 2 causing pressurization of cylinder 130 to swing magazine ejector finger 88 to eject the bottom strip from the stack of strips in the magazine causing the strip to fall to the motion dampening position WBP′. TDL also opens switch TDL-3 in the circuit of relay CR-4 de-energizing the relay which in turn opens CR-4.1. Opening of CR-4.1 opens the power circuit to the solenoid valves M-1 through M-14 causing rotation of the twister heads back to their starting position and extension of dies 404 of crimper units 340, 342, 344 and 346 to the wire-receiving position shown in FIGURE 2.

Thereupon TDL times out energizing timer TDM which in turn opens enslaved switch TDM-1 de-energizing solenoid valve 2 thereby returning the magazine ejecting finger to its starting position. Timer TDM also serves to move the stepping switch (not shown) through its last increment of movement and such switch now returns all the timer units to zero time so the machine is ready to repeat the cycle. TDM also opens switch TDM-2 in the circuit of relay CR-1, TDM2 will de-energize the relay unless the repeat, non-repeat switch 570 is closed. If closed, relay CR–1 is not de-energized and the timer commencing with unit TDL will repeat the above described cycle.

What I claim is:

1. In a machine for twisting a straight-wire loop-connecting portion of a sinuous wire strip: a frame, a rotatable wire-twisting head mounted on the frame and adapted to embrace a loop of a sinuous wire strip, means mounted on the frame to hold against rotation an adjacent oppositely opening loop of the strip from that engaged by said head and at the opposite end of the straight-wire portion to be twisted connecting the two loops, actuating means coupled with the head to rotate it, and distortion-correcting means on said head comprising a member controllably moved to abut the bight portion of the loop embraced by the head and during rotation of the head continuously urge the bight portion of the loop in a direction tending to close the angle between the bight portion and the loop-connecting portion being twisted.

2. The invention as defined in claim 1 characterized in that said distortion-correcting means progressively urges the bight of the loop in a direction closing said angle as the twisting head rotates.

3. The invention as defined in claim 1 characterized in that said actuating means also shifts the head toward and away from the strip to embrace and release the strip, and said distortion-correcting means comprises an element mounted on the head for shiftable movement in a direction toward and away from the bight of the loop embraced by the head with stationary means co-operating with the element to urge it progressively farther in a direction abutting the bight of the loop as the head rotates and eject the bight from the head as the head retracts away from the strip.

4. In a machine for twisting a straight-wire loop-connecting portion of a sinuous wire strip and including means for holding against rotation one of the loops at one end of the straight-wire loop-connecting portion to be twisted: a rotatable wire-twisting head adapted to embrace the loop at the opposite end of the straight-wire loop-connecting portion to be twisted, a member shiftably supported by the head to abut the bight portion of the loop embraced by the head to urge the bight portion in a direction closing the angle between the bight portion and the straight-wire portion being twisted, and means operatively engaged with said member to continuously urge the member in the aforesaid direction closing said angle as the head rotates to twist said straight-wire portion.

5. In a machine for twisting a straight-wire loop-connecting portion of a sinuous wire strip and including a frame with means thereon for holding against rotation one of the loops at one end of the straight-wire portion to be twisted: a rotatable wire-twisting head mounted on the frame and adapted to embrace the loop of the strip at the opposite end of the straight-wire portion to be twisted, a member shiftably supported by the head to abut the bight portion of the loop embraced by the head to urge the bight portion in a direction closing the angle between the bight portion and the straight-wire portion being twisted, and means mounted on the frame and having a camming surface disposed to be swept by said member during rotation of the head to continuously urge the member in the aforesaid direction closing said angle as the head rotates to twist the straight-wire portion.

6. The invention as defined in claim 5 characterized in that spring means are coupled with said member to retract the member upon rotation the head back to the starting position following twisting of said straight-wire portion.

7. The invention as defined in claim 5 characterized in that said head is provided with a loop-receiving slot opening toward the strip and said member is slidable through the head parallel to but axially offset from the rotatable axis of the head and projects through the bottom of the slot to abut the bight portion of the loop received therein and extends at the opposite end out of the head, and said member actuating means comprise a part having a camming surface disposed to be swept by the member as the head rotates to urge the member against the bight of the loop received in said slot as the head rotates.

8. In a machine for bending preformed sinuous wire strips by twisting a straight-wire loop-connecting portion and including means for supporting a strip to be bent and holding against rotation one of the loops at one end of the straight-wire loop-connecting portion to be twisted: a rotatable shaft disposed with its axis substantially coaxial with the straight-wire loop-connecting portion to be twisted, means for rotating the shaft, means supporting a wire-twisting head on the end of the shaft for radial, slidable and adjustable displacement of the head relative to the axis of rotation of the shaft, and means for fixing said head in a radially displaced position, said head being provided with a loop-receiving slot opening toward a wire strip supported in the machine and adapted to embrace the loop of the strip at the other end of the straight-wire loop-connecting portion to be twisted.

9. The invention as defined in claim 8 characterized in that said slot is closed by end walls at opposite ends to locate the loop received in the slot longitudinally of the slot.

10. In a machine for twisting a straight-wire loop-connecting portion of a sinuous wire strip and including a frame with means thereon for holding against rotation one of the loops at one end of the straight wire portion to be twisted: a wire-twisting head mounted on the frame for rotation and for reciprocation toward and away from a wire strip and adapted upon movement toward a strip to embrace that loop thereof at the opposite end of the straight-wire portion to be twisted, a member shiftably supported by the head to abut the bight portion of the loop embraced by the head to urge the bight portion in a direction closing the angle between the bight portion and the straight-wire portion being twisted, and means mounted on the frame having a camming surface disposed in abutment with said member with the surface adapted to urge the member in the aforesaid direction closing said angle as the head rotates to twist the straight-wire loop-connecting portion, with such member actuating means urging the member against the loop embraced by the head to eject the loop from the head upon retraction of the head away from the strip.

11. In a machine for bending preformed sinuous wire strips: a plurality of wire twisting and holding heads arranged in rows on opposite sides of a wire strip bending position and shiftable toward and away from such position to engage and release determined loops of a wire strip in the bending position, means for depositing a wire strip in said bending position, means coupled with said heads to shift them toward and away from the wire bending position, means for engaging a loop at one end of a wire strip in the bending position, strip pulling mechanism at the opposite end of the wire bending position adapted to engage a loop at the opposite end of a strip in said position to stretch the strip between opposite ends a determined amount, and means operatively coupled with the head actuating means and responsive to failure of said pulling mechanism to stretch a strip said determined amount to prevent operation of the head actuating means.

12. In apparatus for bending a preformed wire strip having oppositely open alternate loops disposed substantially in a plane, means defining a bending station comprising strip holding and twisting heads on opposite sides, said heads each being adapted to move between a rest position and a strip engaging position, means at said bending station for tensioning said strip and longitudinally positioning each of the loops of a strip relative to said heads in the station, and means controlled by said longitudinal positioning and tensioning means for controlling operation of said heads.

13. In the apparatus defined in claim 12, said last-named means comprising a powered control circuit for mechanism operating said heads, and said circuit including a normally open circuit completing member that is closed by said strip positioning means.

14. In apparatus for bending a preformed wire strip having oppositely open alternate loops disposed substantially in a plane, means defining a bending station comprising at least one set of opposed strip holding and twisting means adapted to engage adjacent loops of said strip, means at said bending station engageable with each end of said strip for longitudinally positioning each of the loops of a strip relative to said strip holding and twisting means in the station, and means controlled by said longitudinal positioning means for controlling operation of said strip holding and twisting means.

15. Apparatus for bending a portion of a preformed wire strip having oppositely open alternate loops disposed substantially in a plane comprising a wire bending station containing at least one set of strip handling heads, each set comprising a holding head at one side of the station adapted to receive a loop of said strip and a twisting head at the opposite side of the station adapted to receive the next adjacent loop of said strip, both of said heads being mounted for displacement toward and away from a strip receiving position, means for rotating the twisting head to twist the wire portion connecting said adjacent loops to impart a desired bend to the strip, and means operative during rotation of the twisting head for engaging the bight of the loop received by said twisting head and urging it away from said twisting head to tend to reduce the angle between said bight and the twisted wire portion.

16. In the apparatus defined in claim 15, said bight engaging means comprising a reciprocable cam actuated member which also serves to eject the strip from the twisting head upon movement of the twisting head away from strip receiving position.

17. Apparatus for bending a portion of a preformed wire strip having oppositely open alternate loops disposed substantially in a plane comprising a wire bending station containing at least one set of strip handling heads, each set comprising a holding head at one side of the station adapted to receive a loop of said strip and a twisting head at the opposite side of the station adapted to receive the next adjacent loop of said strip, both of said heads being mounted for displacement toward and away from a strip engaging position, means for rotating the twisting head to twist the wire portion connecting said adjacent loops to impart a desired bend to the strip, said twisting head comprising a loop bight receiving channel member, and means for correcting for planar distortion of the strip comprising means for adjusting said channel member to an offset position relative to the axis of rotation of said twisting head.

18. In apparatus for bending a preformed formed spring wire strip having oppositely open alternate loops lying substantially in a plane, a magazine containing a stack of said strips, each of said strips being disposed in a substantially horizontal plane, means including a horizontally extending member pivotable about a substantially vertical axis for successively shifting only the lowermost strip longitudinally thus releasing it from the magazine and dropping it below the magazine, and means for arresting the fall of the extracted strip for a predetermined period and then releasing the strip to drop further to a strip bending station in said apparatus.

19. In apparatus for bending a preformed wire strip having oppositely open alternate loops disposed substantially in a plane, means defining a bending station comprising strip holding and twisting heads on opposite sides, said heads each being adapted to move between a rest position and a strip engaging position, means at said bending station for longitudinally positioning each of the loops of a strip relative to said heads in the station, said means including means attached to opposite ends of said strip, and means controlled by said longitudinal positioning means for controlling operation of said heads.

20. In apparatus for bending a preformed formed spring wire strip having oppositely open alternate loops lying substantially in a plane, a magazine containing a stack of said strips in superposed relation, each of said strips being disposed in a substantially horizontal plane, and means for extracting the lowermost strip only from the magazine and dropping it below the magazine comprising a horizontally extending power driven member pivotable about a substantially vertical axis and adapted to extend into a loop of the strip at the bottom of the stack and shift said bottom strip longitudinally into alignment with a discharge opening in the magazine to drop therethrough.

References Cited in the file of this patent

UNITED STATES PATENTS

| | | |
|---|---|---|
| 1,123,823 | Wadsworth | Jan. 5, 1915 |
| 1,123,893 | Kitchen | Jan. 5, 1915 |
| 2,549,061 | Dauenhauer | Apr. 17, 1951 |
| 2,632,482 | Lincoln | Mar. 24, 1953 |
| 2,646,086 | Smith | July 21, 1953 |
| 2,744,546 | Williams | May 3, 1956 |
| 2,770,262 | Gauci | Nov. 13, 1956 |
| 2,777,476 | Fante et al. | Jan. 15, 1957 |
| 2,800,928 | Norman | July 30, 1957 |
| 2,809,675 | Silko | Oct. 15, 1957 |
| 2,884,962 | Ott et al. | May 5, 1959 |
| 2,940,480 | Fante et al. | June 14, 1960 |
| 2,957,500 | Hollyday | Oct. 25, 1960 |
| 2,995,157 | Catini | Aug. 8, 1961 |
| 3,022,804 | Corp | Feb. 27, 1962 |
| 3,047,031 | Came et al. | July 31, 1962 |